(12) United States Patent
Watanabe et al.

(10) Patent No.: US 8,284,642 B2
(45) Date of Patent: Oct. 9, 2012

(54) OPTICAL DISK APPARATUS

(75) Inventors: Katsuya Watanabe, Nara (JP); Shinichi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/152,579

(22) Filed: Jun. 3, 2011

(65) Prior Publication Data
US 2011/0299370 A1 Dec. 8, 2011

(30) Foreign Application Priority Data

Jun. 8, 2010 (JP) ................................. 2010-130716

(51) Int. Cl.
*G11B 7/00* (2006.01)
(52) U.S. Cl. ................. 369/44.27; 369/44.25; 369/53.2; 369/94
(58) Field of Classification Search ............... 369/44.25, 369/44.27, 44.26, 44.28, 94, 112.02, 112.23, 369/53.2, 53.23
See application file for complete search history.

(56) References Cited

U.S. PATENT DOCUMENTS

| | | | | |
|---|---|---|---|---|
| 2003/0202437 A1* | 10/2003 | Yamada et al. | ............ | 369/44.29 |
| 2005/0207304 A1* | 9/2005 | Murotani | ................ | 369/53.23 |
| 2005/0276176 A1* | 12/2005 | Cheu et al. | ................ | 369/44.28 |
| 2007/0183278 A1* | 8/2007 | Yamada et al. | ............ | 369/44.29 |
| 2007/0189141 A1* | 8/2007 | Okamatsu | .................. | 369/53.2 |
| 2008/0089193 A1* | 4/2008 | Kim et al. | .................. | 369/44.27 |
| 2009/0034378 A1* | 2/2009 | Wu et al. | .................... | 369/47.14 |
| 2009/0092026 A1* | 4/2009 | Watanabe et al. | ............. | 369/100 |
| 2009/0268574 A1* | 10/2009 | Kim | ............. | 369/53.17 |
| 2010/0118669 A1* | 5/2010 | Maruyama | ................. | 369/44.27 |
| 2010/0265804 A1* | 10/2010 | Kataoka | .................... | 369/44.32 |
| 2011/0051575 A1* | 3/2011 | Ishikawa | .................... | 369/44.28 |
| 2011/0128839 A1* | 6/2011 | Imai | ........................ | 369/112.23 |

FOREIGN PATENT DOCUMENTS

| | | |
|---|---|---|
| JP | 01-096828 | 4/1989 |
| JP | 2007-095218 | 4/2007 |
| JP | 2009-140573 | 6/2009 |
| JP | 2009-230781 | 10/2009 |

* cited by examiner

*Primary Examiner* — Thang Tran
(74) *Attorney, Agent, or Firm* — Renner, Otto, Boisselle & Sklar, LLP

(57) ABSTRACT

An optical disk apparatus according to the present invention includes: a controller 111, which receives an instruction that a layer-to-layer jump be performed from a current layer to a target layer; a layer-to-layer jump control section 146, which adjusts a spherical aberration correction value to the target layer and then gets the layer-to-layer jump attempted; a decision section 146 for determining whether the layer-to-layer jump has been carried out successfully; and a layer determining section 146 for determining, if the focus position has been set on a non-target storage layer as a result of the layer-to-layer jump, where the non-target storage layer is located in the optical disk. The layer-to-layer jump control section 146 shifts the focus position of the light beam from that non-target storage layer to the target layer by reference to information indicating which of the multiple storage layers the non-target storage layer is.

20 Claims, 21 Drawing Sheets

FIG.11

| | TRIPLE-LAYER | | QUADRUPLE-LAYER | |
|---|---|---|---|---|
| | LAYER'S LEVEL (SPIRAL DIRECTION) | SPHERICAL ABERRATION | LAYER'S LEVEL (SPIRAL DIRECTION) | SPHERICAL ABERRATION |
| L0 | 100 μm (IN>OUT) | CORRESPONDING TO −25 μm (−25mλ) | 100 μm (IN>OUT) | CORRESPONDING TO −35 μm (−35mλ) |
| L1 | 75 μm (OUT>IN) | 0 μm | 84.5 μm (OUT>IN) | CORRESPONDING TO −19.5 μm (−19.5mλ) |
| L2 | 57 μm (IN>OUT) | CORRESPONDING TO +18 μm (−18mλ) | 65 μm (IN>OUT) | 0 μm |
| L3 | — | — | 54.5 μm (OUT>IN) | CORRESPONDING TO +10.5 μm (10.5mλ) |

OPTICAL DISK APPARATUS

BACKGROUND OF THE INVENTION

1. Field of the Invention

The present invention relates to how to make a layer-to-layer jump on a single-sided stacked multilayer optical disk with three or more information layers and also relates to an optical disk apparatus for performing read/write operation on such an optical disk.

2. Description of the Related Art

In optical disk technologies, data can be read out from a rotating optical disk by irradiating the disk with a relatively weak light beam with a constant intensity, and detecting the light that has been modulated by, and reflected from, the optical disk. On a read-only optical disk, information is already stored as pits that are arranged spirally during the manufacturing process of the optical disk. On the other hand, on a rewritable optical disk, a recording material film, from/on which data can be read and written optically, is deposited by evaporation process, for example, on the surface of a substrate on which tracks with spiral lands or grooves are arranged. In writing data on a rewritable optical disk, data is written there by irradiating the optical disk with a light beam, of which the optical power has been changed according to the data to be written, and locally changing the property of the recording material film.

In this description, an information layer on which data has been written and/or a layer on which data can be written will be referred to herein as an "information layer" or simply a "layer". A multilayer optical disk is an optical disk in which a number of information layers are stacked one upon the other at predetermined intervals. In such a multilayer optical disk, the distance (or depth) from its light incident surface is different from one information layer to another. Also, when an optical disk is irradiated with a light beam that has been converged by an objective lens, a spherical aberration is produced. The magnitude of such a spherical aberration varies according to the depth of the target information layer but is preferably as small as possible. That is why in order to condense a light beam onto the target information layer, the condensing state of the light beam needs to be adjusted and the magnitude of the spherical aberration needs to be changed so that the spherical aberration is minimized on that information layer.

For a multilayer disk, a so-called "layer-to-layer jump" (which is also called a "focus jump") technique, which is a technique for moving the target focus position of a focus actuator quickly from one layer to another, is an indispensable technique. However, after the layer-to-layer jump operation has been started, the focus may be set by mistake on a wrong information layer instead of the target layer.

Japanese Patent Application Laid-Open Publication No. 2009-230781 discloses a method for determining on which layer the focus position is now located after a layer-to-layer jump has been made on a double-layer BD. For example, before a jump is made from L0 layer to L1 layer, the spherical aberration is corrected with a spherical aberration correction value set for a collimator lens driver. After that, the layer-to-layer jump is made. If the jump to the L1 layer has been done successfully, then the TE signal should have the same amplitude before and after the jump. On the other hand, if the jump has failed and the focus has been set on the L0 layer again by mistake, then the amplitude of the TE signal after the jump has been made is much smaller than that of the TE signal before the jump is made. Thus, by comparing the amplitudes of the TE signal before and after the jump with special attention paid to that characteristic, it can be determined whether or not the focus position has reached the target layer successfully.

Meanwhile, Japanese Patent Application Laid-Open Publication No. 2007-095218 does not disclose a layer-to-layer jump method but a method for determining on which layer of a multilayer disk the focus position is currently located during a focus search operation. For that purpose, the amplitude of a TE signal (or an RF signal or any other similar signal) associated with the target layer is stored in advance. And the amplitude of a TE signal (or an RF signal or any other similar signal) that has been measured on the layer on which the focus has been set is compared to the amplitude stored, thereby determining whether or not the focus position has reached the target layer.

That is why with the technique disclosed in Japanese Patent Application Laid-Open Publication No. 2009-230781 or No. 2007-095218 adopted, it can also be determined, even in a multilayer disk (which is typically a multilayer BD), whether the layer on which the focus position that has been shifted through either a focus search operation or a layer-to-layer jump operation is currently located is a target layer or not.

However, the techniques disclosed in both of those two patent applications are basically designed for a double-layer BD. That is why unless the layer on which the focus position is currently located turns out to be the target layer as a result of the layer decision process, the layer-to-layer jump operation should be retried again so that the focus position can reach the target layer. Or a recovery process should be performed by defocusing the light beam once and then attempting to set the focus on the target layer all over again.

Suppose in a triple-layer disk in which L0, L1 and L2 layers are stacked one upon the other, the focus position needs to be shifted from the L0 layer to the L1 layer through a focus jump operation. In that case, if the amplitude of the TE signal measured on the current layer is smaller than either a predetermined value or that of the TE signal associated with the L0 layer, then it can at least be seen, even according to the conventional techniques, that the current layer is not the L1 layer. However, according to such methods, it cannot be determined whether i) the focus position has gone over the L1 layer to reach the L2 layer or ii) has come back to the L1 layer by mistake.

Consequently, in the prior art, once a layer-to-layer jump has failed on a multilayer disk, it is not clear in which direction the focus position needs to go, no matter whether it should attempt to reach the target layer once again or just go back to the original layer. That is to say, in such a situation, it is so difficult for the focus position to go directly to the target L1 layer or simply go back to the original L0 layer that the system might sometimes fail or it would take a lot of time for the system to make a recovery.

It is therefore an object of the present invention to provide an optical disk apparatus, which can always shift the focus position from one of three or more layers of a multilayer disk to another both quickly and with good stability by re-setting the focus position swiftly even if a layer-to-layer jump operation has once failed on any of those layers and if the focus has been set on a non-target layer by mistake. Another object of the present invention is to provide a method for making a layer-to-layer jump on a multilayer optical disk using such an optical disk apparatus.

SUMMARY OF THE INVENTION

A layer-to-layer jump method according to the present invention is a method of making a layer-to-layer jump on a multilayer optical disk that has multiple storage layers. The method includes the steps of: receiving a layer-to-layer jump instruction that the focus position of a light beam be shifted from a current layer of the multilayer optical disk, on which the focus position is currently located, to a target layer; adjusting a spherical aberration correction value to the target layer and then attempting the layer-to-layer jump toward the target layer; if the layer-to-layer jump has failed, determining where a non-target storage layer, on which the focus position has been set by mistake as a result of the layer-to-layer jump, is located; and retrying the layer-to-layer jump from that non-target storage layer that has been located to the target layer.

In one preferred embodiment, the step of determining where the non-target storage layer is located is carried out by comparing a spherical aberration correction value, which increases the amplitude of a TE signal of the non-target storage layer and which has been obtained through spherical aberration learning, to a spherical aberration correction value that is stored in advance in a memory for each said layer.

In another preferred embodiment, the step of determining where the non-target storage layer is located is carried out by comparing a focus drive value for the non-target storage layer to a focus drive value that is stored in advance in a memory for each said layer.

In still another preferred embodiment, the step of determining where the non-target storage layer is located is carried out by readjusting the spherical aberration correction value and then reading an address from the storage layer on which the focus position of the light beam is currently located.

In this particular preferred embodiment, the step of determining where the non-target storage layer is located includes readjusting the spherical aberration correction value over and over again until the address is read successfully from the storage layer on which the focus position of the light beam is currently located.

In yet another preferred embodiment, the method further includes the step of determining whether or not the layer-to-layer jump has been done successfully. If the amplitude of the TE signal after the layer-to-layer jump has been made is less than a predetermined value, then it is determined that the focus position has been set on the non-target storage layer as a result of the layer-to-layer jump.

In yet another preferred embodiment, the method further includes the step of determining whether or not the layer-to-layer jump has been done successfully. If the amplitude of the TE signal after the layer-to-layer jump has been made is equal to or greater than a predetermined value but if no addresses are readable from the current layer or if the address that has been read from the current layer is not the target layer's, then it is determined that a wrong layer focusing error has occurred.

In yet another preferred embodiment, the step of retrying the layer-to-layer jump from the non-target storage layer to the target layer includes changing, on that non-target storage layer, the focus position of the light beam along the radius of the optical disk before retrying the layer-to-layer jump from the non-target storage layer to the target layer.

In yet another preferred embodiment, the method includes the step of registering, if the layer-to-layer jump has failed a number of times at the same radial location, a particular area including that radial location at a storage medium.

In yet another preferred embodiment, the step of retrying the layer-to-layer jump from the non-target storage layer to the target layer includes changing, on that non-target storage layer, the focus position of the light beam along the radius of the optical disk before retrying the layer-to-layer jump from the non-target storage layer to the target layer anywhere but in the registered area.

An optical disk apparatus according to the present invention performs a read/write operation on a multilayer optical disk that has multiple storage layers. The apparatus includes: a controller, which receives an instruction that the focus position of a light beam be shifted to a target layer, which is one of the multiple storage layers; a control section, which adjusts a spherical aberration correction value to the target layer and then attempts to shift the focus position of the light beam toward the target layer; and a layer determining section for determining, if the focus position has not been shifted successfully, where a non-target storage layer on which the focus position has been set by mistake is located. The control section shifts the focus position of the light beam from that non-target storage layer to the target layer by reference to information indicating which of the multiple storage layers the non-target storage layer is.

In one preferred embodiment, the optical disk apparatus includes a memory that stores a spherical aberration correction value for each said layer. The determining section compares a spherical aberration correction value, which increases the amplitude of a TE signal of the non-target storage layer where the focus position has turned out to be currently set by mistake and which has been obtained through spherical aberration learning, to a spherical aberration correction value that is stored in the memory for each said layer, thereby determining where the non-target storage layer is located in the optical disk.

In another preferred embodiment, the optical disk apparatus includes a memory that stores a focus drive value for each said layer. The determining section compares a focus drive value for the non-target storage layer where the focus position has turned out to be currently set by mistake to a focus drive value that is stored in the memory for each said layer, thereby determining where the non-target storage layer is located in the optical disk.

A multilayer optical disk focus setting method according to the present invention is a method for setting a focus with respect to a multilayer optical disk that has multiple storage layers. The method includes the steps of: receiving a focus setting instruction that the focus position of a light beam be shifted to a target layer; adjusting a spherical aberration correction value to the target layer and then attempting the focus setting operation; if the focus setting operation has failed, determining where a non-target storage layer, on which the focus position has been set by mistake, is located in the optical disk; and making a layer-to-layer jump from that non-target storage layer that has been located to the target layer. The step of locating the non-target storage layer is carried out by comparing a spherical aberration correction value, which increases the amplitude of a TE signal of the non-target storage layer and which has been obtained through spherical aberration learning, to a spherical aberration correction value that is stored in advance in a memory for each said layer.

In one preferred embodiment, the step of determining where the non-target storage layer is located is carried out by comparing a focus drive value for the non-target storage layer on which the focus position has turned out to be set by mistake to a focus drive value that is stored in advance in a memory for each said layer.

In another preferred embodiment, the step of determining where the non-target storage layer is located is carried out by readjusting the spherical aberration correction value and then reading an address from the storage layer on which the focus position of the light beam is currently located.

In this particular preferred embodiment, the step of determining where the non-target storage layer is located includes readjusting the spherical aberration correction value over and over again until the address is read successfully from the storage layer on which the focus position of the light beam is currently located.

In still another preferred embodiment, the method includes the step of determining whether or not the focus setting operation has been done successfully. If the amplitude of the TE signal after the focus setting operation has been performed is less than a predetermined value, then it is determined that the focus position has been set on the non-target storage layer as a result of the layer-to-layer jump.

In yet another preferred embodiment, the method includes the step of determining whether or not the focus setting operation has been done successfully. If the amplitude of the TE signal after the focus setting operation has been performed is equal to or greater than a predetermined value but if no addresses are readable from the current layer or if the address that has been read from the current layer is not the target layer's, then it is determined that a wrong layer focusing error has occurred.

According to the layer-to-layer jump method and optical disk apparatus of the present invention, even if a focus position has been set on a non-target storage layer by mistake as a result of a layer-to-layer jump operation, it can be determined accurately whether that non-target storage layer is located shallower or deeper than the target layer and the focus position can be quickly shifted to the target layer.

BRIEF DESCRIPTION OF THE DRAWINGS

FIG. 11 summarizes the depths of respective information layers of triple-layer and quadruple-layer disks and the magnitudes of spherical aberrations to be produced.

DETAILED DESCRIPTION OF PREFERRED EMBODIMENTS

Configuration for Optical Disk Apparatus for Each Preferred Embodiment of this Invention Hereinafter, an optical disk apparatus for use in first, second and third specific preferred embodiments of the present invention (to be described below) for performing a read/write operation on a multilayer optical disk will be described.

Figure 1:
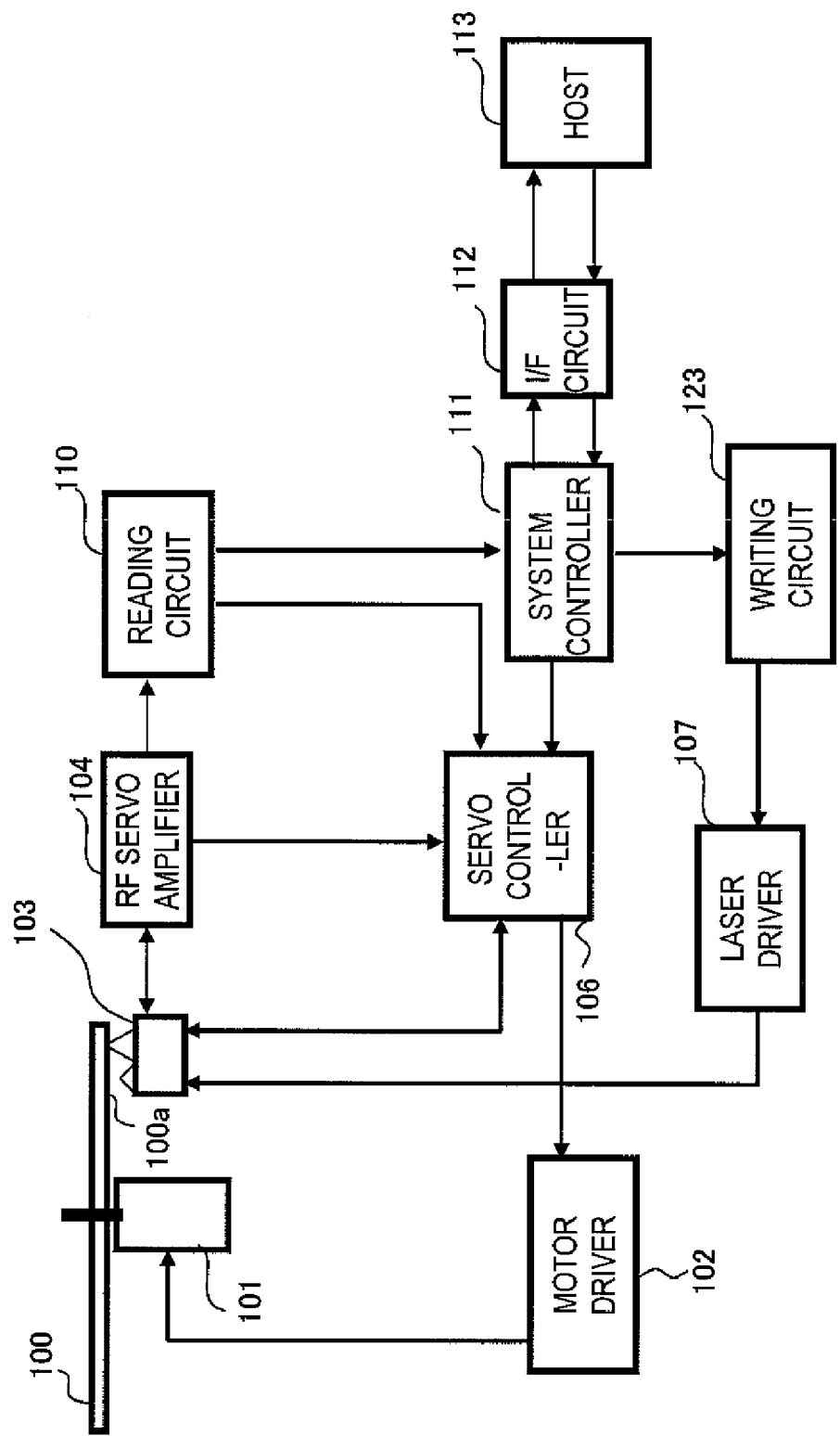
FIG. 1 is block diagram illustrating an optical disk apparatus according to first through third preferred embodiments of the present invention.
Figure 5:
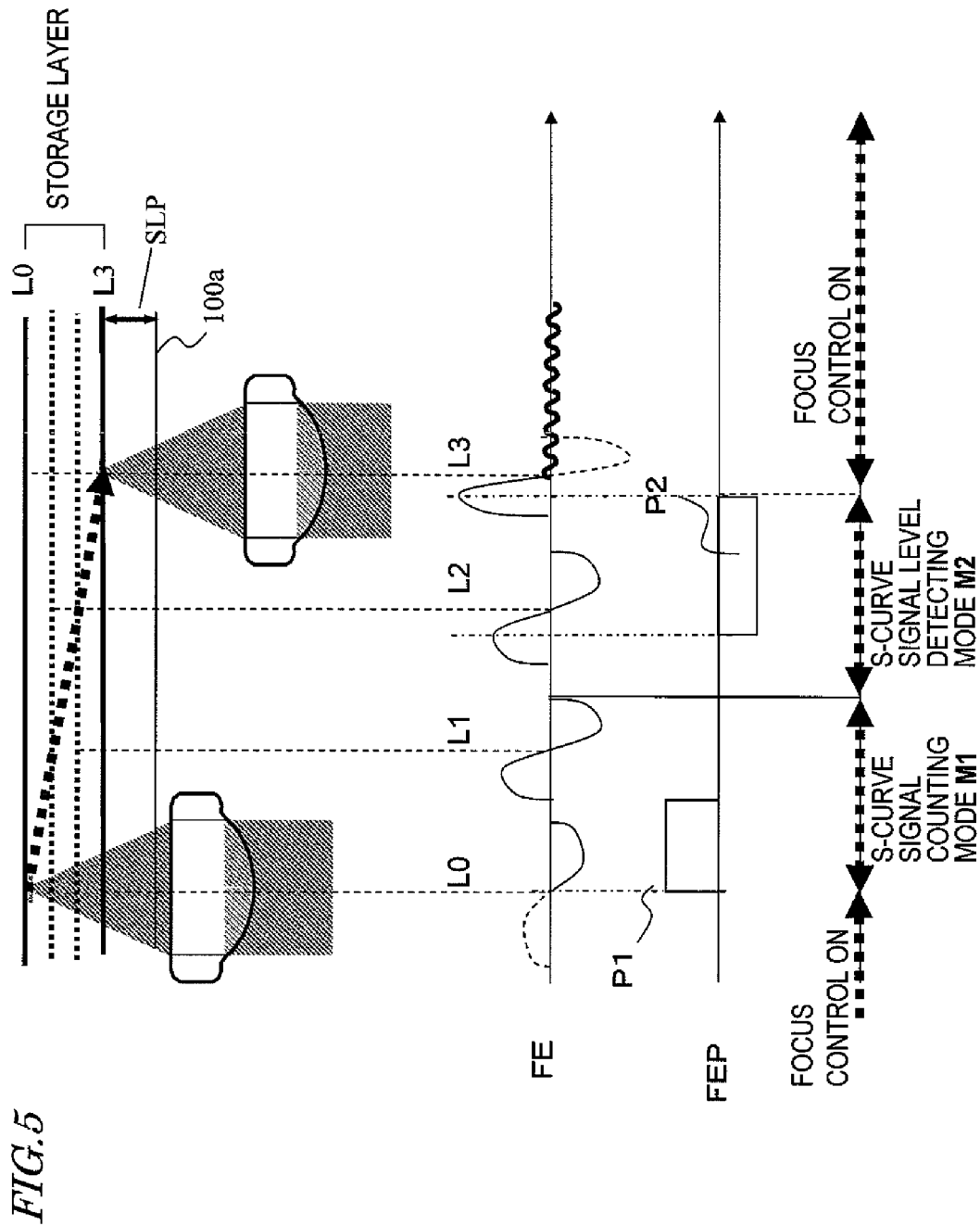
FIG. 5 illustrates where the objective lens moves while a layer-to-layer jump from the deepest L1 layer to the shallowest L4 layer is being performed and also shows how an S-curve signal is generated when the light beam spot passes through each layer of a multilayer BD.

FIG. 1 is block diagram illustrating an optical disk apparatus as a preferred embodiment of the present invention. The first, second and third preferred embodiments of the present invention to be described below are compatible with single-layer and double-layer BDs, CDs and DVDs and multilayer BDs, CDs and DVDs with three or more storage layers. In the following example, however, the optical disk apparatus is supposed to be applied to a quadruple-layer BD. And a cross section of such a quadruple-layer BD is schematically shown in FIG. 5 as will be described later.

An optical disk apparatus according to this preferred embodiment includes: a controller 111, which receives an instruction that the focus position of a light beam be shifted to a target layer, which is one of the multiple storage layers a given multilayer optical disk; a control section (CPU) 146, which adjusts a spherical aberration correction value to the target layer and then attempts to shift the focus position of the light beam toward the target layer (through both the layer-to-layer jump and the focus setting operation); and a layer determining section (CPU) 146 for determining, if the focus position has not been shifted successfully, where a non-target storage layer on which the focus position has been set by mistake is located. The control section 106 shifts the focus position of the light beam from that non-target storage layer to the target layer by reference to information indicating which of the multiple storage layers the non-target storage layer is.

The optical disk apparatus of this preferred embodiment includes an optical pickup 103, which includes an optical system for converging a light beam onto the optical disk 100, a photodetector for detecting the light that has been reflected from the optical disk 100, and a laser diode as a light source. The optical disk apparatus further includes a servo controller 106 for controlling the operation of the optical pickup 103, a reading circuit 110 for reading an information signal that has been detected by the optical pickup 103 on the optical disk 100, and a writing circuit 123 for writing the information on the optical disk 100 by getting pulsed laser beams emitted from a laser diode by the laser driver 107 by a predetermined modulation technique according to the information to be written.

The optical pickup 103 irradiates the optical disk 100, which has been mounted on the optical disk motor 101, with a converged laser beam. An RF servo amplifier 104 generates an electrical signal based on the light that has been reflected from the optical disk 100. The servo controller 106 performs a focus control and a tracking control on the optical disk 100 that has been mounted on the optical disk motor 101 by controlling the motor driver 102 and the optical pickup 103. The servo controller 106 also has the function of determining, by irradiating the optical disk 100 with a light beam using the light source and lenses, whether the given optical disk 100 is a BD or not (i.e., a disk type recognition function), and whether the disk 100 has only one layer, two layers, or more than two storage layers (i.e., a number of layers determining function).

The reading circuit 110 gets the electrical signal, which has been supplied from the RF servo amplifier 104, equalized by a waveform equalizer, for example, thereby generating an analog read signal, which is converted into a digital signal and then synchronized with a read clock signal (i.e., a reference clock signal) by a PLL. In this manner, the data can be extracted. Thereafter, the data is subjected to predetermined demodulation and error correction and then supplied to a system controller 111, which transfers the data to a host 113 by way of an I/F circuit 112, and to the servo controller 106.

Then, the writing circuit 123 adds a header and redundant bits for error correction to the data, modulates it into a predetermined modulation pattern (by predetermined modulation technique), and then gets pulsed laser beams emitted from the laser diode in the optical pickup 103 by the laser driver 107 in order to write the information that has been supplied from the host 113 by way of the I/F circuit 112 on the optical disk 100. By varying the reflectance of the recording material (such as an organic material or a phase change material) of the optical disk 100 according to the degree of intensity modulation of the laser beam that has been incident on the optical disk 100, information is written as ones or zeros.

Figure 2:
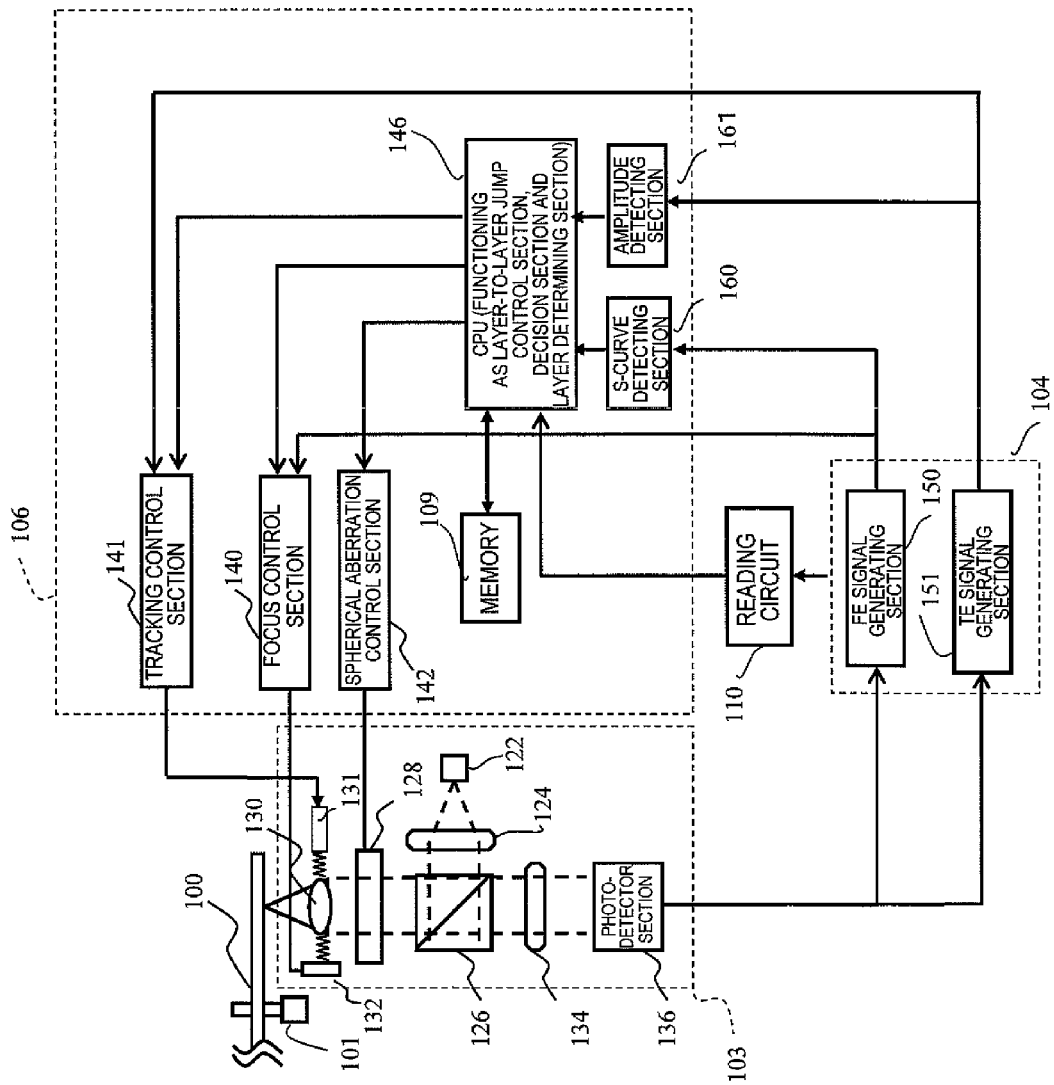
FIG. 2 is a block diagram illustrating, in further detail, the optical pickup, the servo controller and their surrounding sections shown in FIG. 1

FIG. 2 is a block diagram illustrating, in further detail, the optical pickup, the servo controller and their surrounding sections shown in FIG. 1, which are major components contributing to getting the multilayer disk layer-to-layer jump operation of this preferred embodiment done. These components will be further described with reference to FIG. 2.

First of all, the configuration of the optical pickup will be described. The optical pickup 103 shown in FIG. 2 includes a light source 122, a coupling lens 124, a polarization beam splitter 126, a spherical aberration corrector 128, an objective lens 130, actuators 131 and 132, a condenser lens 134 and a photodetector 136.

The light source 122 is implemented as a semiconductor laser diode for emitting a light beam. Only one light source 122 is illustrated in FIG. 2 for the sake of simplicity. Actually, however, the light source may include three semiconductor laser diodes that emit light beams with mutually different wavelengths. More specifically, the single optical pickup preferably includes multiple semiconductor laser diodes for emitting light beams with mutually different wavelengths for CDs, DVDs and BDs, respectively.

The coupling lens 124 transforms the light beam that has been emitted from the light source 122 into a parallel beam. The polarization beam splitter 126 reflects the parallel beam that has come from the coupling lens 124. Since the position of the semiconductor laser diode in the light source 122 and the wavelength of the light beam to be emitted change according to the type of the optical disk, the best configuration of the optical system also changes according to the type of the optical disk 100. That is why the configuration of the optical pickup 103 is actually more complicated than the illustrated one.

The objective lens 130 converges the light beam that has been reflected from the polarization beam splitter 126. The actuators 131 and 132 control the position of the objective lens 130 to a predetermined one based on the TE and FE signals. In reading or writing data from/on an information storage layer of the optical disk 100, the focal point of the light beam that has been converged by the objective lens 130 is located on the information storage layer, thereby forming a light beam spot on the information storage layer. Only one objective lens 130 is shown in FIG. 2. Actually, however, multiple objective lenses 130 need to be provided and used selectively according to the type of the given optical disk 100. In reading and writing data, the focus servo and tracking servo are turned ON and the position of the objective lens 130 is controlled precisely so that the focal point of the light beam follows the target track on the information storage layer.

This preferred embodiment is an optical disk apparatus for performing a read/write operation on an optical disk 100 using the blue-violet laser diode 122 and the objective lens 130 with a high NA. That is why the configuration of the optical pickup is simplified into the one shown in FIG. 2 for the sake of simplicity.

After the optical disk apparatus has been loaded with the BD disk 100 and before the operation of reading or writing data from/on an arbitrary one of the multiple storage layers is started, the objective lens 130 is driven by the actuator 132 along the optical axis so that the focus position is shifted between the multiple layers of the optical disk 100. Such an operation will be referred to herein as a "layer-to-layer jump".

Figure 3:
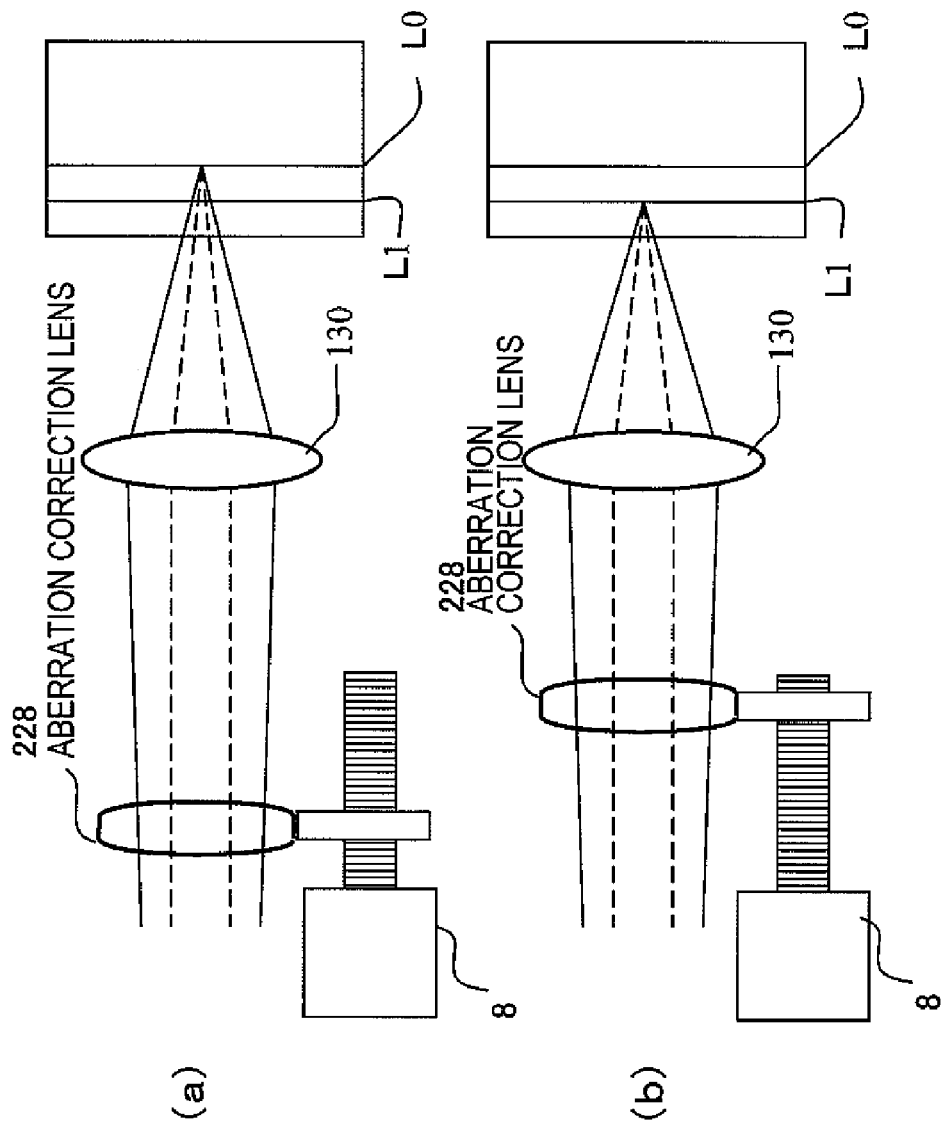
FIG. 3 illustrates the internal arrangement of the spherical aberration corrector 128.

The spherical aberration corrector 128 may include a spherical aberration correction lens 228, of which the position can be changed in the optical axis direction, for example, as shown in FIG. 3 and may have a beam expander structure in which the spherical aberration state (corresponding to the magnitude of correction) can be changed by adjusting the position of the aberration correction lens 228. However, the spherical aberration corrector 128 does not have to have such a beam expander structure, but may also have a configuration for correcting the aberration using a liquid crystal element or a hinge, for example.

The light beam that has been reflected from the information storage layer of the BD disk 100 passes through the objective lens 130, spherical aberration corrector 128 and polarization beam splitter 126 and then enters the condenser lens 134, which converges, onto the photodetector 136, the light beam that has been reflected from the optical disk 100 and then transmitted through the objective lens 130 and the polarization beam splitter 126. On receiving the light that has been transmitted through the condenser lens 134, the photodetector 136 converts the optical signal into various electrical signals (e.g., current signals). The photodetector 136 may be a quadruple photodetector with four photosensitive areas, for example.

The servo controller 106 shown in FIG. 2 includes a focus control section 140, a tracking control section 141, and a spherical aberration control section 142. Using these circuit sections, the CPU 146 controls various kinds of operations to be performed by the optical pickup 103.

The RF/servo amplifier 104 further includes an FE signal generating section 150, a TE signal generating section 151, and an RF signal generating section.

The servo controller 106 further includes an S-curve detecting section 160 for detecting an S-curve from the output signal of the FE signal generating section 150, an amplitude detecting section 161 for detecting the amplitude of a TE signal from the output signal of the TE signal generating section 151, and a memory 109 to be used in the first and second preferred embodiments of the present invention to be described later. In the first preferred embodiment, the memory 109 will store spherical aberration correction values for respective storage layers of the optical disk. In the second preferred embodiment, on the other hand, the memory 109 will store the focus drive values for the respective storage layers of the optical disk.

The CPU 146 is a member that performs various kinds of operations, and functions as a layer-to-layer jump control section for getting a layer-to-layer jump done, a decision section for determining whether or not the layer-to-layer jump has been done successfully, and a layer determining section for determining which of the multiple storage layers the non-target storage layer is if the focus position has been set on that non-target by mistake as a result of the layer-to-layer jump operation.

The focus control section 140 drives the actuator 132 in accordance with the instruction given by the CPU 146, thereby moving the objective lens 130 to any arbitrary position along the optical axis, and also controls the converging state of the light beam.

On the other hand, the tracking control section 141 drives the actuator 131 in accordance with the instruction given by the CPU 146, thereby moving the objective lens 230 to any radial location on the optical disk, and also performs a tracking control so that the light beam spot on the optical disk follows the right tracks.

In accordance with the instruction given by the CPU 146, the spherical aberration control section 142 controls the spherical aberration corrector 128 into a predetermined setting. Specifically, in response to the control signal supplied from the spherical aberration control section 142, the stepping motor 8 shown in FIG. 3 operates so as to move the aberration correction lens 228 to a predetermined position, which is defined by the depth of the first or second information layer if the given optical disk is a double-layer disk. By changing the position (i.e., the position in the optical axis direction) of the aberration correction lens 228, the spherical aberration state of the light beam can be regulated. The same operation or function can be done in a similar manner in any of the triple- to twenty-layer optical disk. In this manner, the spherical aberration can be minimized on the target information layer. In this description, to control the spherical aberration so that the spherical aberration is minimized on the target information layer will be referred to herein as "setting a spherical aberration value associated with the target layer" or "setting a spherical aberration correction value associated with the target layer".

The FE signal generating section 150 generates an FE signal based on the electrical signals that have been supplied from multiple photosensitive areas of the photodetector section 136. The FE signal may be generated by any method. Examples of methods for generating the FE signal include an astigmatism method, a knife edge method or even a spot sized detection (SSD) method. The output FE signal of the FE signal generating section 150 is supplied to the S-curve detecting section 160, which sets a predetermined detection threshold value in accordance with the instruction given by the CPU 146.

The S-curve detecting section 160 determines whether or not the level of the FE signal exceeds a predetermined threshold value while the objective lens 130 is moving along the optical axis to make a focus search, thereby detecting an S-curve signal.

According to this preferred embodiment, after the spherical aberration value has been set according to the depth of the target layer (i.e., the distance from the light incident surface of the optical disk to the target layer), the tracking control and the focus control are turned OFF and an acceleration pulse is applied to the actuator 132. After the objective lens 130 has been driven toward the target layer, the S-curve detecting section 160 senses that the focus position has reached the vicinity of the target layer and a deceleration pulse is output. Then, the focus control is started when the target layer is reached with the shift velocity sufficiently decreased, and therefore, the focus position can be moved with good stability.

Figure 4:
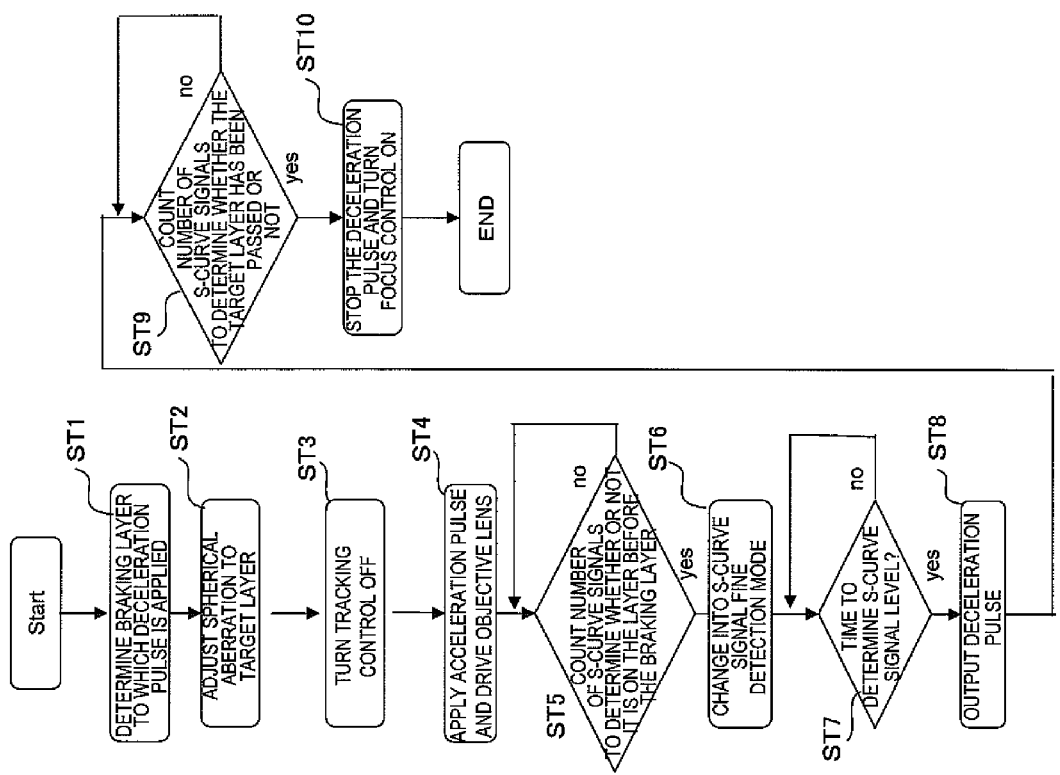
FIG. 4 is a flowchart showing the procedure of a layer-to-layer jump operation.

FIG. 4 is a flowchart showing the procedure of a layer-to-layer jump operation. On the other hand, FIG. 5 illustrates the waveforms of acceleration and deceleration pulses to be applied to the FE and focus drive signals during that operation.

First, in Step ST1 shown in FIG. 4, if the focus position is now set on the deepest layer (i.e., the L0 layer) and if it is currently in a standby state, a seek command is received from the host 113. And if the target address is a track address on the shallowest layer (i.e., the L3 layer), then the focus position should be shifted from the L0 layer to the L3 layer, and the layer at which the shift velocity of the focus position should start to be slowed down (i.e., the braking layer) is set to be the L2 layer, which is located deeper than, and adjacent to, the L3 layer that is the end point of the layer-to-layer jump. That is to say, the timing to apply the deceleration pulse P2 is defined to be when an S-curve signal is detected before the focus position reaches the L2 layer.

Next, in Step ST2, the spherical aberration control section 142 is instructed to drive the spherical aberration correction lens 228 shown in FIG. 3 so that the correction value agrees with the depth of the L3 layer that is the destination of the layer-to-layer jump (i.e., the distance from the light incident surface of the optical disk to the L3 layer). In other words, a spherical aberration correction value associated with the target layer is set.

In FIG. 5, FE signals (i.e., S-curve signals) obtained from the L0 through L3 layers are also shown schematically. In this example, the focus position is shifted after the spherical aberration correction has been made so that the target L3 layer has a minimum spherical aberration (and ideally has zero spherical aberration). That is why the closer to the L3 layer (i.e., the destination of the layer-to-layer jump) the focus position gets as the objective lens moves along the optical axis, the greater the amplitude of an S-curve signal when each information layer is passed. And the S-curve signal obtained from the L3 layer comes to have the greatest amplitude.

After the spherical aberration correction lens 228 has been driven, first of all, the S-curve detection level is lowered (i.e., brought closer to zero) in Step ST3. In this manner, the modes of operation are changed into an S-curve counting mode M1 (which will also be referred to herein as "S-curve signal coarse detection mode M1" and) in which S-curve signals can also be detected safely even from information layers that have not been subjected to the spherical aberration correction and in which the number of information layers can be counted. Thereafter, the tracking control is turned OFF and an acceleration pulse P1 is applied to the focus actuator 132 in Steps ST3 and ST4. In response to the acceleration pulse P1 applied, the focus actuator 132 drives the objective lens 130 with acceleration in the optical axis direction. In this manner, the focus position shifts across the information layers and toward the end point of the layer-to-layer jump.

In Step ST5, every time the focus position passes an information layer (i.e., the L1 layer and then the L2 layer in this example), the S-curve signal is output. That is why by counting the number of the S-curve signals output, it can be seen exactly where the focus position being shifted is currently located. Next, in Step ST6, when it is known, by the count of the S-curve signals, that the L1 layer, which precedes the L2 layer that is the braking layer, is passed, the deceleration pulse P2 is output. That is why the S-curve signal will be detected from the L2 layer in an S-curve signal fine detection mode M2.

Next, in Step ST7, the level of the S-curve signal is determined. When the shallowest portion of the L2 layer is detected by a half of the S-curve signal, it means that this is the right time to output the deceleration pulse. Thus, in Step S8, the pulse height value of the deceleration pulse P2 is determined by the amount of time it has taken to get there and then that value is output. And the deceleration pulse needs to stop being applied when it is known, by the count of the S-curve signals, that the layer beyond the end point of the layer-to-layer jump is reached.

If it has been decided, in Step ST9, that the layer beyond the end point of the layer-to-layer jump has been reached, the deceleration pulse stops being output in Step S10 (more specifically, when a half of the S-curve signal representing the deepest portion of the L3 layer is detected). Then, the focus control is turned ON immediately. Since the shift velocity of the focus position has already been reduced sufficiently by then, the focus can be set on the target layer with very good stability.

In this case, in a multilayer disk with three or more information layers, an error that could never happen in a double-layer disk would occur during the layer-to-layer jump operation. As for a double-layer disk, there can be only two types of errors unless the target layer is reached. Specifically, in that case, either the focus control has failed completely or the focus position has just returned to the original layer. And if the focus control has failed, then no TE signal or RF signal can be obtained at all. That is why just by detecting a decrease in the amplitude of the TE signal representing a spherical aberration that has been caused due to the difference in depth between the information layers as in the prior art, it can be determined whether the focus position has reached the target layer successfully or failed to reach it and returned to the original layer.

In a multilayer disk with three or more information layers, on the other hand, errors may occur not just in such a situation where the focus position has just returned to the original layer but also in a situation where the focus control gets done erroneously on a wrong layer that is located either before or beyond the target layer halfway through the layer-to-layer jump operation. That is why even if it has turned out, by comparing the amplitudes of TE or RF signals to each other by a conventional technique, that the focus position seems to have reached the target layer, nobody knows exactly which of the multiple layers the focus position has reached and in which direction the jump has to be made once again.

To overcome such a problem, the present invention provides a method for detecting an error while performing a layer-to-layer jump operation on a multilayer disk, a method for recovering from such an error, and a scheme that carries out such an error detection and recovery. Hereinafter, such methods and scheme will be described as first through third preferred embodiments of the present invention.

A layer-to-layer jump error recovery method according to the present invention is a method of recovering from an error that has occurred while a layer-to-layer jump is being made on a multilayer optical disk with multiple storage layers. The method includes the steps of: receiving a layer-to-layer jump instruction that the focus position of a light beam be shifted from a current layer of the multilayer optical disk, on which the focus position is currently located, to a target layer; adjusting a spherical aberration correction value to the target layer of the layer-to-layer jump and then attempting the layer-to-layer jump toward the target layer; determining whether or not the layer-to-layer jump has been made successfully; if it has been turned out that the focus position has been set on a non-target storage layer as a result of the layer-to-layer jump, determining which of the multiple storage layers the non-target storage layer is; and retrying the layer-to-layer jump from that non-target storage layer that has been located to the target layer.

The step of determining which of the multiple storage layers the non-target storage layer is may be performed by any of the following three methods to be described for the first, second and third preferred embodiments of the present invention:

1) by comparing a spherical aberration correction value, which increases the amplitude of a TE signal of the non-target storage layer where it has been determined the focus position has been set by mistake and which has been obtained through spherical aberration learning, to a spherical aberration correction value that is stored in advance in a memory for each layer;
2) by comparing a focus drive value for the non-target storage layer where it has been determined the focus position has been set by mistake to a focus drive value that is stored in advance in a memory for each layer; and
3) readjusting the spherical aberration correction value and then reading an address from the storage layer on which the focus position of the light beam is currently located. In that case, the spherical aberration correction value is preferably re-set over and over again until the address can be read successfully from the storage layer on which the focus position of the light beam is currently located.

(Embodiment 1)

Figure 6:
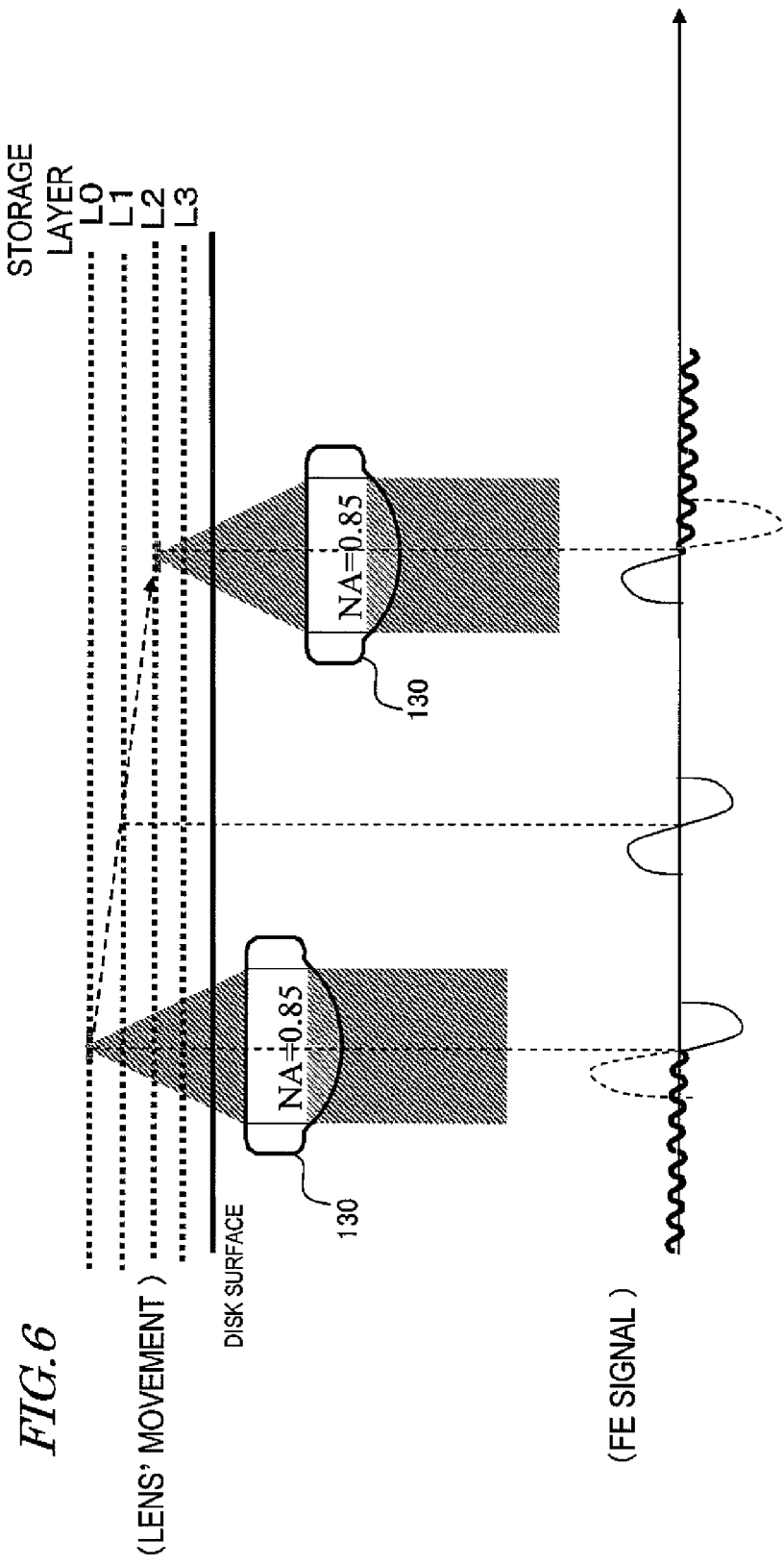
FIG. 6 is the first schematic representation showing how to perform error detection and recovery using S-curve signals.
Figure 7:
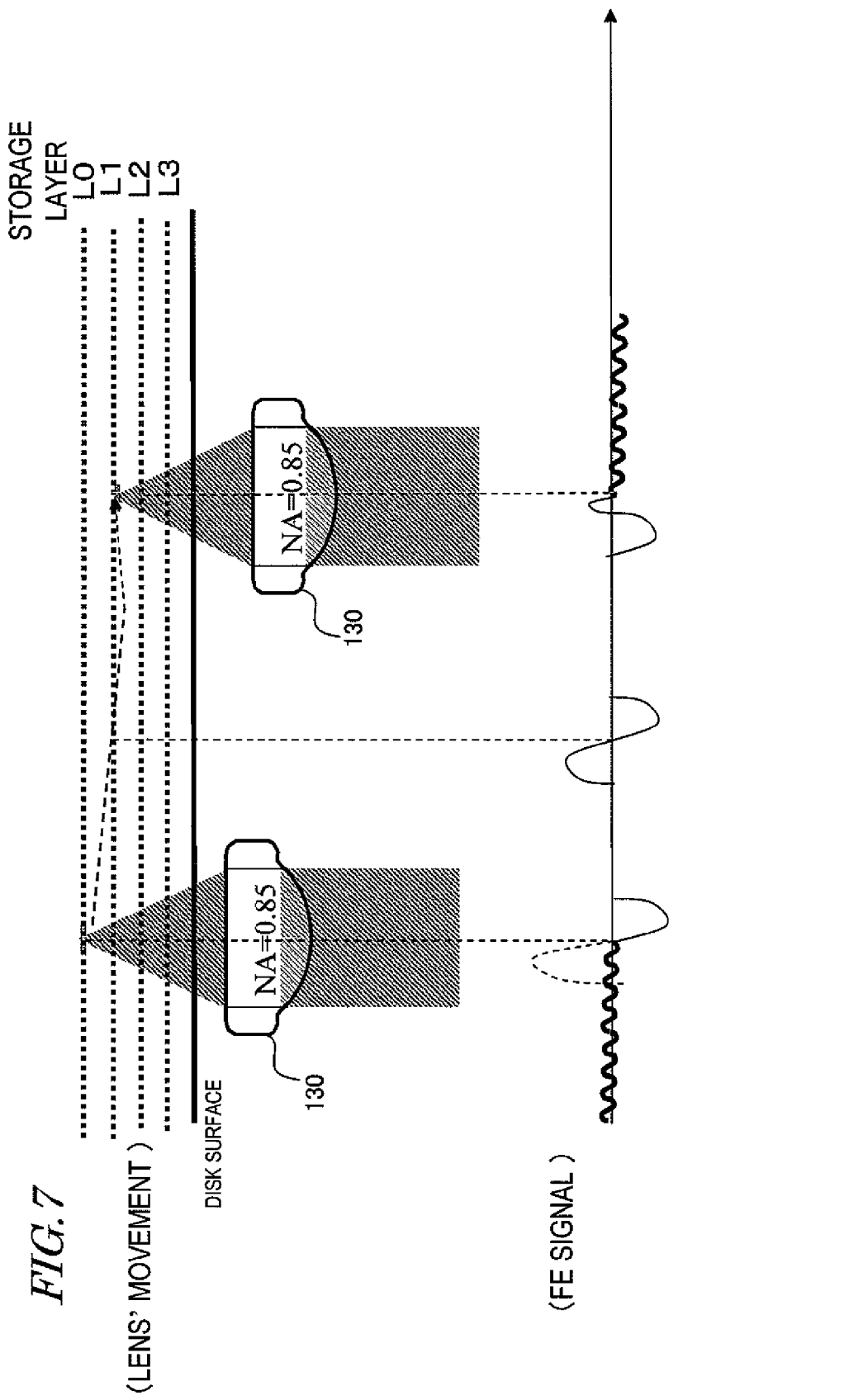
FIG. 7 is the second schematic representation showing how to perform error detection and recovery using S-curve signals.
Figure 8:
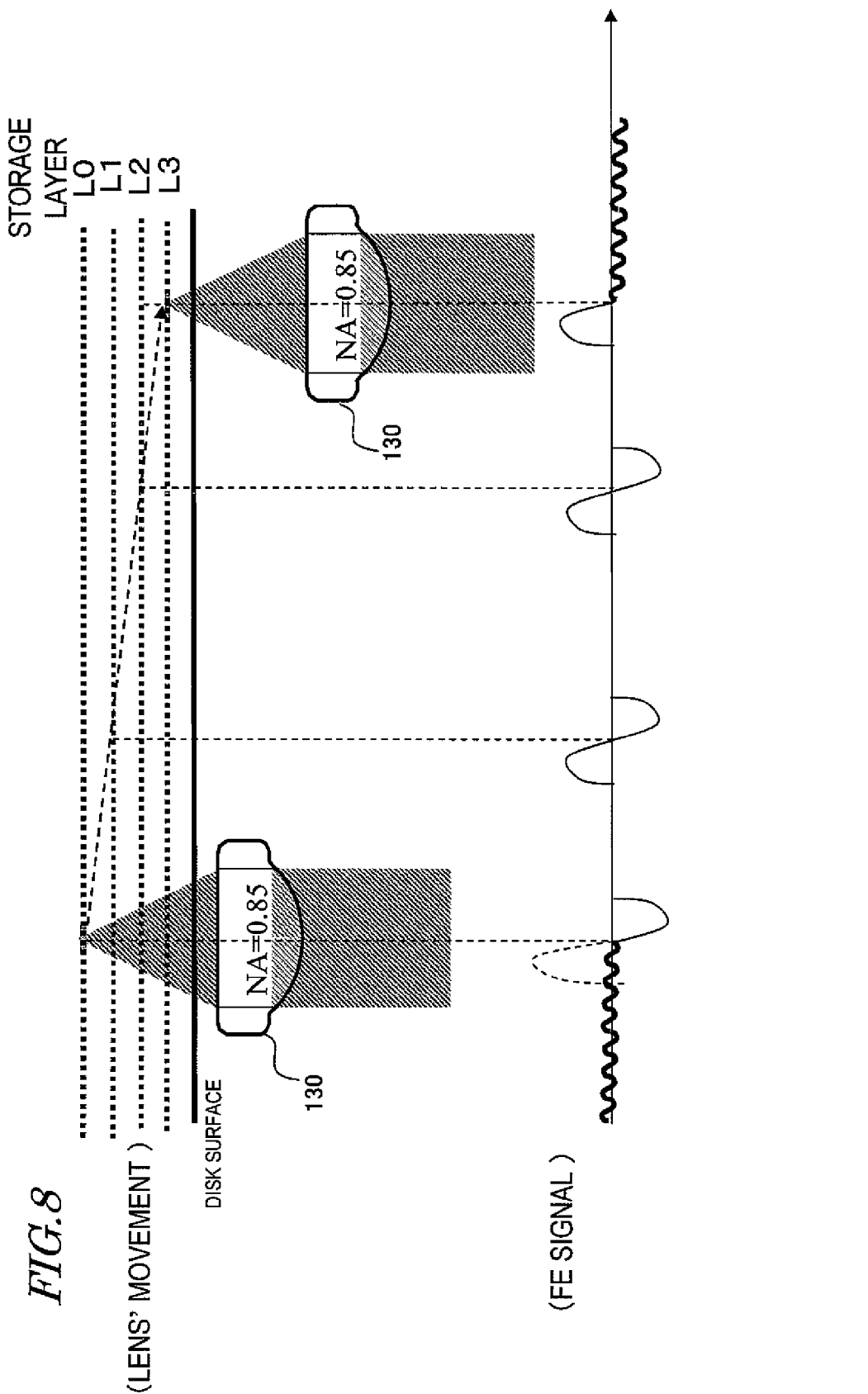
FIG. 8 is the third schematic representation showing how to perform error detection and recovery using S-curve signals.

Detection of Layer-to-Layer Jump Error and Recovery with Spherical Aberration Correction Value FIGS. 6 through 8 are schematic representations illustrating how the objective lens moves while a layer-to-layer jump operation is performed on a quadruple-layer BD, for example, to shift the focus position from the deepest L0 layer to the target L2 layer by way of the adjacent L1 layer and how S-curve signals are generated as the light beam spot passes each of the multiple layers of the multilayer BD.

Specifically, FIG. 6 illustrates a situation where the focus position has reached the target L2 layer successfully. On the other hand, FIG. 7 illustrates a situation where the focus position has failed to reach the target layer but has been set by mistake on the L1 layer that precedes the target layer. And FIG. 8 illustrates a situation where the focus position has gone beyond the target L2 layer and has been set by mistake on the L3 layer that follows the target layer.

Figure 9:
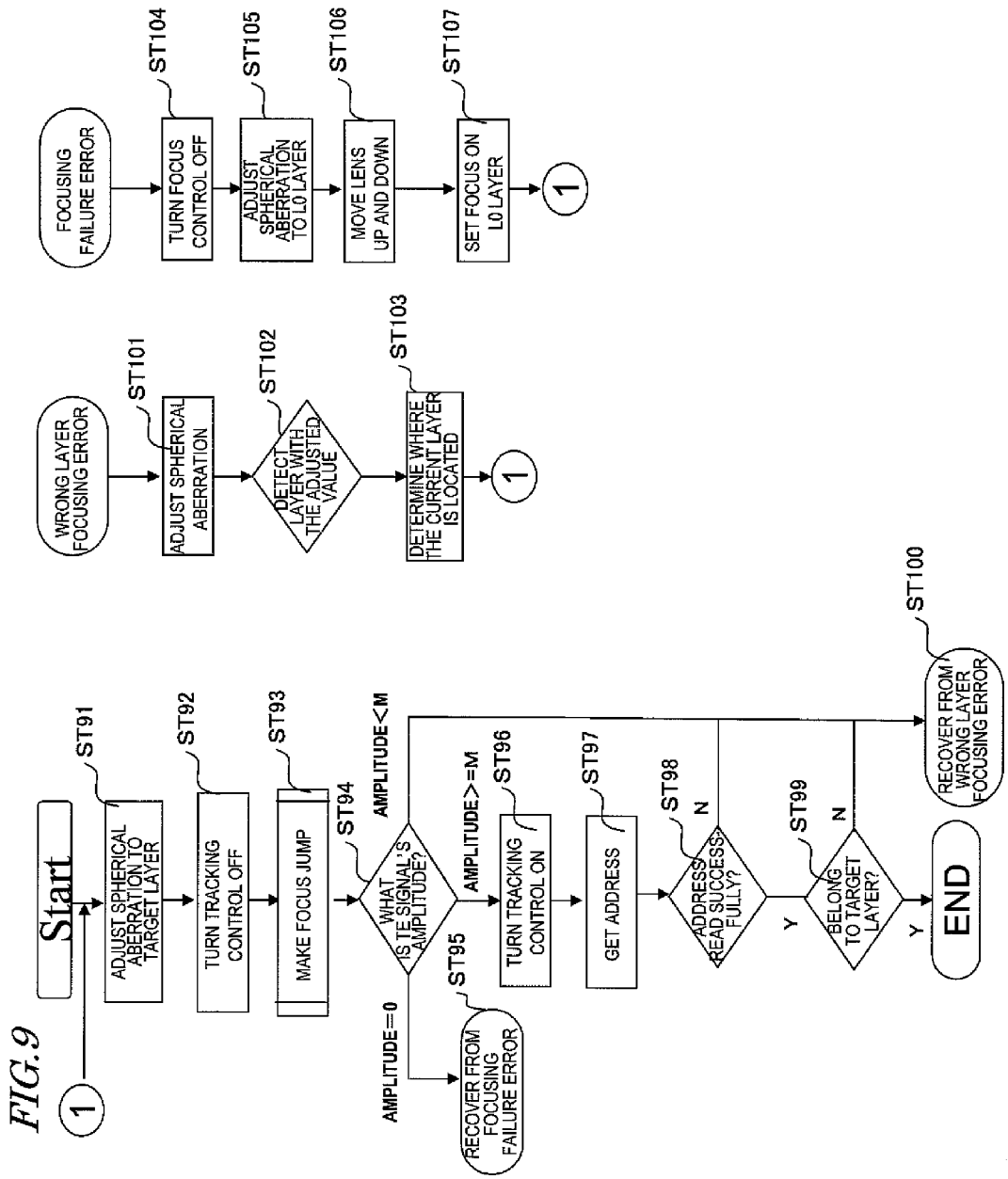
FIG. 9 is a flowchart showing how to detect an error and how to recover from that error according to the first preferred embodiment.
Figure 10:
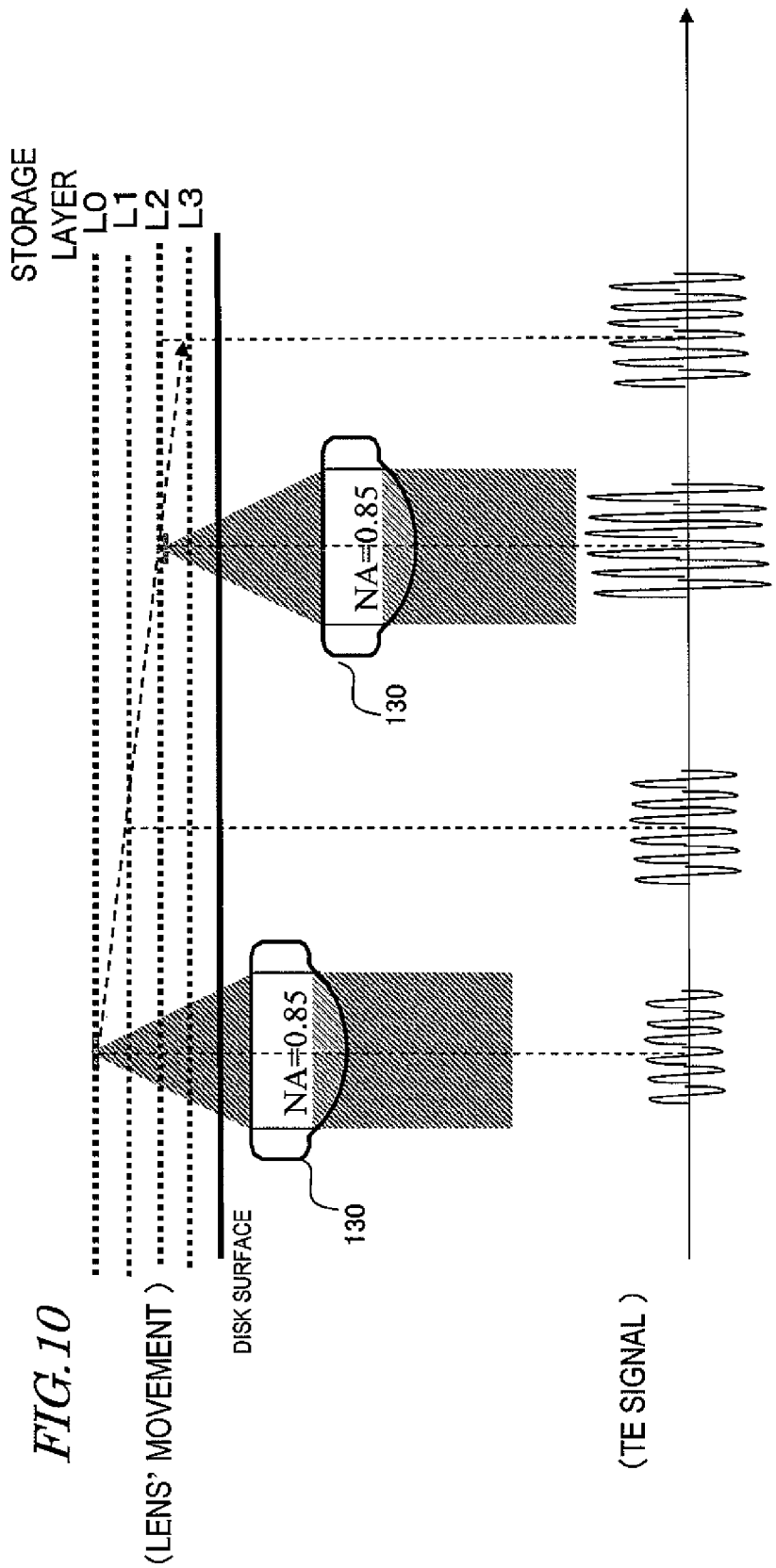
FIG. 10 is a schematic representation illustrating the amplitudes of a TE signal to show how to perform error detection and recovery according to the first preferred embodiment.

FIG. 9 is a flowchart showing how to detect a layer-to-layer jump error and how to recover from that error. FIG. 10 illustrates the amplitudes of a TE signal on respective information layers of a quadruple-layer BD in a situation where a spherical aberration is adjusted to the information layer depth of the L3 layer. And FIG. 11 summarizes the depths of respective layers of a triple-layer BD and a quadruple-layer BD (i.e., the distances from the light incident surface of the optical disk to the respective information layers) and the magnitudes of spherical aberrations to be produced when the focus is set on the L1 layer of the triple-layer BD and on the L2 layer of the quadruple-layer BD, respectively.

As shown in FIG. 10, in the quadruple-layer disk, for example, the TE signal has the maximum amplitude on the L2 layer. Thus, by storing that amplitude during learning in which a spherical aberration correction value for a disk loading process is determined and comparing the amplitude of the TE signal to the stored one, it can be determined whether or not the focus position has reached the target L2 layer. Also, even if the focus position is set on a non-target layer and the tracking control is turned ON, the spherical aberration will be too big (e.g., as much as 5 μm or more) to read the address as intended. That is why it can also be determined, by the availability of the addresses, whether or not the focus position has reached the target L2 layer successfully. In this manner, according to the first preferred embodiment of the present invention, it can be seen, by the error of the spherical aberration, that the focus position has failed to reach the target layer as a result of the layer-to-layer jump operation.

Hereinafter, the procedure of detecting a layer-to-layer jump error and recovering from that error will be described in detail with reference to the flowchart shown in FIG. 9.

On receiving a layer-to-layer jump instruction to shift the focus position of the light beam from the current layer of the multilayer optical disk 100 to the target layer, first, a spherical aberration is adjusted to the target layer in Step ST91. Next, the tracking control is turned OFF in Step ST92. And in Step ST93, the layer-to-layer jump operation that has already been described with reference to FIG. 4 is carried out.

Then, in Step ST94, the amplitude detecting section 161 measures the amplitude of a TE signal after the layer-to-layer jump operation has been performed, thereby determining whether or not the TE signal is output at all and whether the amplitude of the TE signal is less than, or equal to or greater than, a predetermined value M. If the focus control has failed entirely as a result of the layer-to-layer jump operation, then no TE signal is output at all. If the TE signal has zero amplitude, it is determined that the focus control has failed and the process advances to the processing step ST95 of recovering from such a focusing failure error as will be described later.

On the other hand, if it has been determined in Step ST94 that the amplitude of the TE signal is smaller than the predetermined value M, then the focus control has not failed completely but the focus position of the light beam must have been set by mistake on the L1 layer halfway as shown in FIG. 7 or have gone beyond the target L2 layer to reach the L3 layer as shown in FIG. 8. In this case, the predetermined value M may be either the TE signal amplitude value that has been measured and stored while the spherical aberration is adjusted during the disk loading process or a standard value or a fixed value that has been determined based on the process data. If the amplitude of the TE signal is smaller than M, the CPU (i.e., the decision section) 146 determines that the focus position has been set on a non-target layer and the process advances to Step ST100 of recovering from such a wrong layer focusing error as will be described later.

Furthermore, if the CPU (decision section) 146 has found in Step ST94 the amplitude of the TE signal not less than the predetermined value M, then probably the focus position has reached the target layer. That is why in that case, the tracking control is turned ON in Step ST96 to get the address of that layer in Step ST97. If address information has been obtained successfully in Step ST98 and has turned out to be the address on the target layer in Step ST99, then it can be seen that the layer-to-layer jump has been done successfully, and the process ends normally.

On the other hand, if no address information has been obtained in Step ST98, then the CPU 146 determines that the focus position has been set on a non-target layer and the process advances to Step ST100 of recovering from such a wrong layer focusing error as will be described later.

Next, it will be described how to recover from such a wrong layer focusing error.

First of all, in Step ST101, with the tracking control kept OFF if the amplitude of the TE signal has decreased or turned OFF again if no address information has been obtained, spherical aberration learning is carried out so that the amplitude of the TE signal becomes maximum on that layer.

In this case, the spherical aberration value that has been adjusted so as to maximize the amplitude of the TE signal on each layer is preferably stored in the memory 109 shown in FIG. 2 during the disk loading process. Such spherical aberration adjustment forms an essential part of a disk loading process that needs to be carried out to get tracking control done with stability, and a read/write operation performed as intended, on each layer of a high-density optical disk such as a BD (and such a process is also called a "disk loading and learning process"). That is why the processing step of storing the spherical aberration adjusted value may form an integral part of the spherical aberration learning process and does not have to be any additional processing step.

Next, in Step ST102, the CPU (i.e., the layer determining section) 146 determines, by using such a spherical aberration value that maximizes the amplitude of the TE signal, on which of the multiple layers the focus position is currently located. For example, if the spherical aberration has been adjusted to the L2 layer of a quadruple-layer disk, then a significant spherical aberration will be produced on each of its adjacent L1 and L3 layers due to the difference in information layer depth as shown in FIG. 10. Thus, by comparing the re-adjusted spherical aberration value to the spherical aberration value that is stored in the memory for each layer, the CPU (layer determining section) 146 can determine easily where the focus position of the light beam is currently located (i.e., which of the multiple storage layers the non-target storage layer (the current layer) is) in Step ST103.

If the current layer has turned out, as a result of the spherical aberration re-adjustment, to be the L1 layer that precedes the target layer, then the spherical aberration for the target L2 layer is re-set in Step ST91 and then a layer-to-layer jump operation is performed in Step ST93 so that the distance to go for the focus position is extended by one layer. On the other hand, if the current layer has turned out to be the L3 layer that follows the target layer, then the spherical aberration for the target L2 layer is re-set in Step ST91 and then a layer-to-layer jump operation is performed in Step ST93 so that the distance to go for the focus position is shortened by one layer.

On the other hand, if a focusing failure error has occurred, the focus control is once turned OFF in Step ST104, and the objective lens is returned to its rest position. Next, in Step ST105, the spherical aberration is adjusted to the deepest L0 layer and the objective lens is once taken away from, and then brought toward, the disk in Step ST106. Then, in Step ST107, the focus position is set on the L0 layer, and then a layer-to-layer jump toward the target L2 layer is retried.

As described above, even if the focus position has been set on a wrong layer of a quadruple-layer disk, the error can be detected and recovery from that error can made quickly, no matter what pattern of layer-to-layer jump has been made on that disk.

In addition, according to this preferred embodiment, the error is detected based on the magnitude of the spherical aberration associated with the current layer on which the focus position has been set, because the spherical aberration varies with the depth of the information layer. That is why if the depths of respective information layers are defined by standard or if the spherical aberration can be adjusted to each layer during the disk loading process, recovery can be made easily from any such error. Consequently, the technique of the present invention is applicable effectively to not just a quadruple-layer disk but also any other multilayer disk with three or more information layers.

A multilayer BD player, for example, may also be designed so as to determine that the target layer has not been reached if the amplitude of an RF signal, not the TE signal, is equal to or smaller than a predetermined value.

(Embodiment 2)

Detection of Layer-to-Layer Jump Error and Recovery with Drive Value

Figure 12:
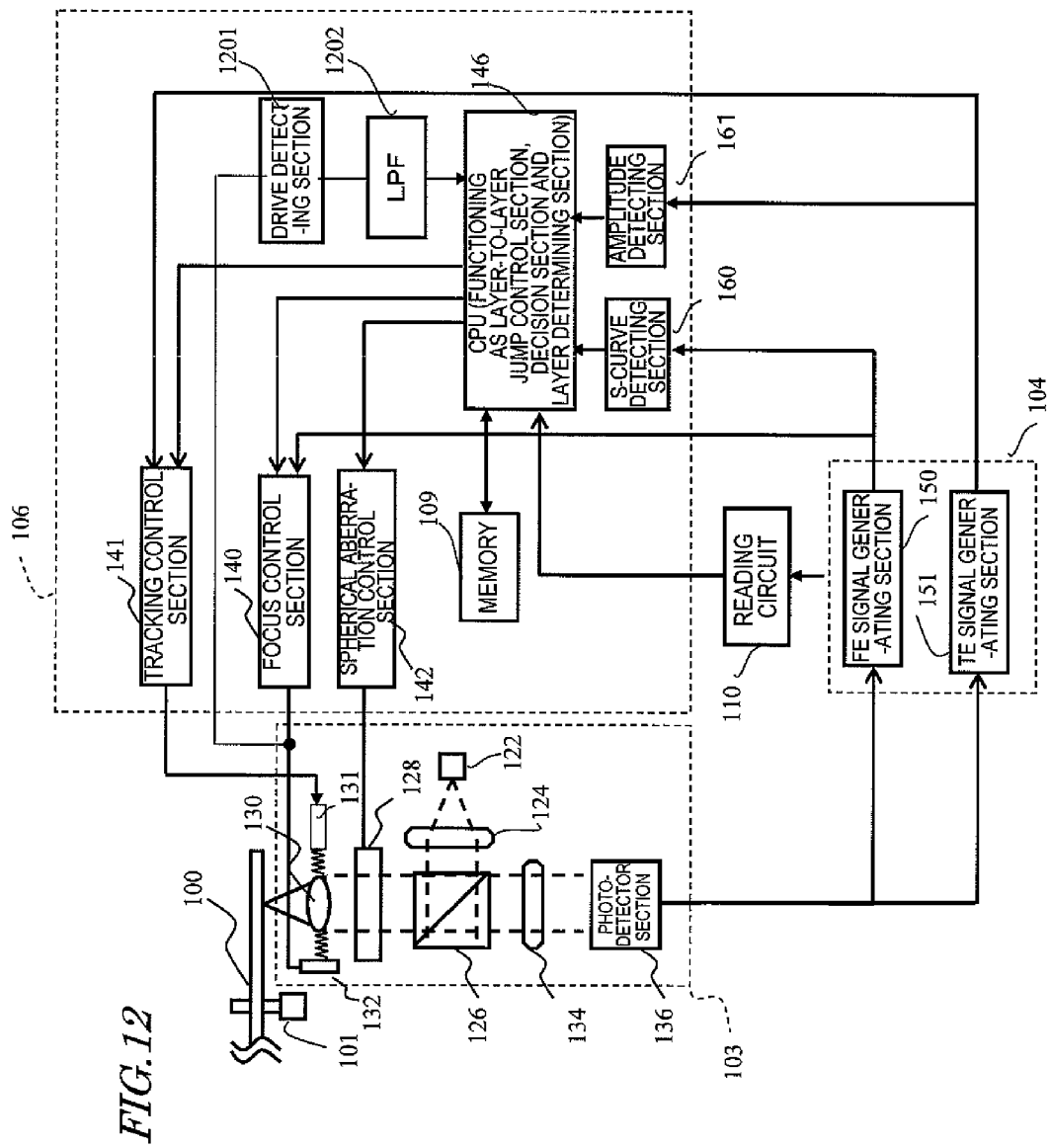
FIG. 12 is a block diagram illustrating an optical disk apparatus according to a second preferred embodiment of the present invention.

A second specific preferred embodiment of the present invention to be described below is also supposed to be applied to a situation where a layer-to-layer jump is made from the L0 layer of a quadruple-layer disk to the L2 layer thereof. In this second preferred embodiment, an optical disk apparatus that has a similar configuration to its counterpart of the first preferred embodiment shown in FIG. 1 is used but the arrangement shown in FIG. 2 is replaced with the one shown in FIG. 12. That is to say, in this preferred embodiment, the CPU 146 performs the layer-to-layer jump control processing in a different manner.

Figure 13:
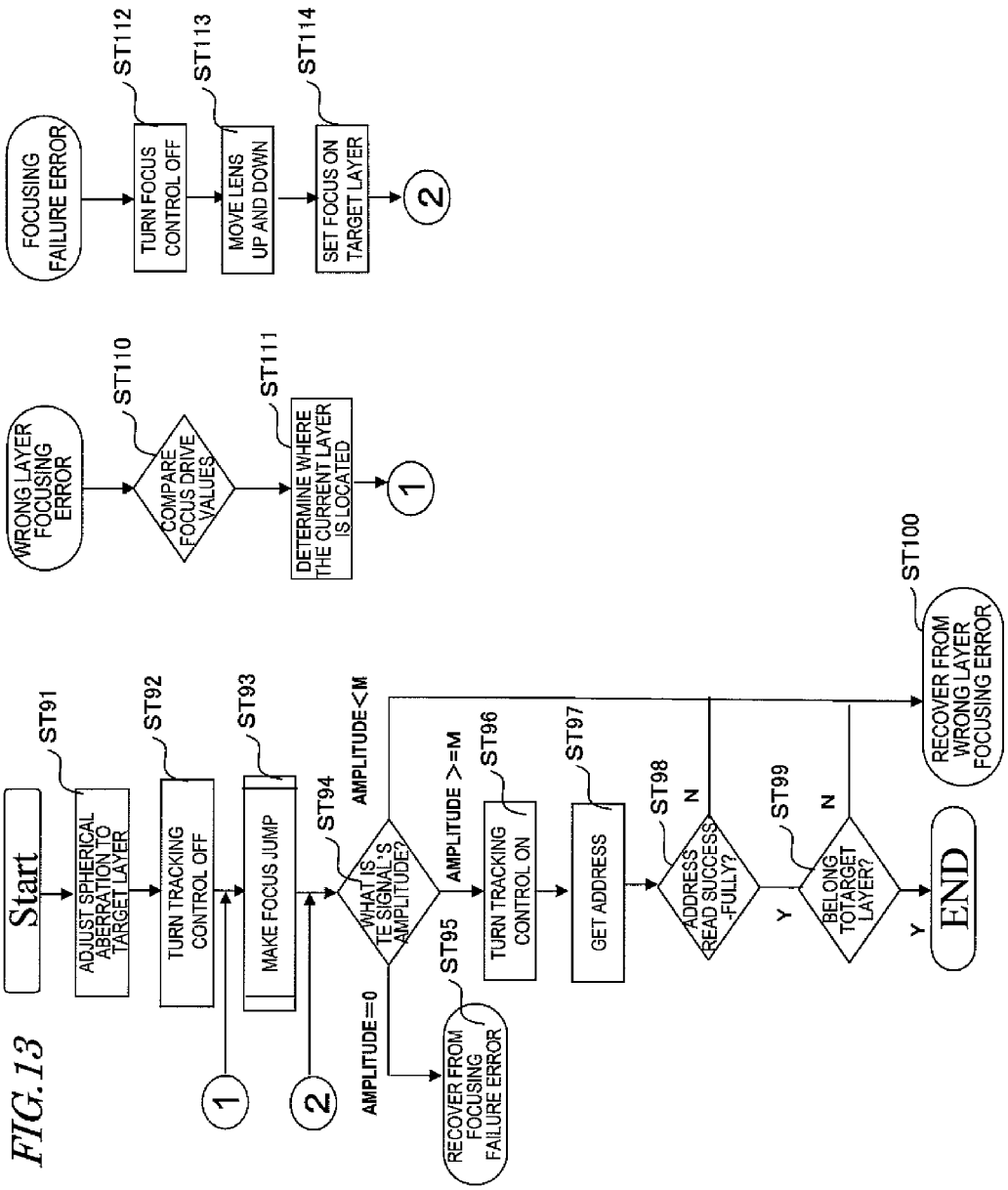
FIG. 13 is a flowchart showing the procedure of error detection and recovery according to the second preferred embodiment.

FIG. 13 is a flowchart showing the procedure of error detection and recovery according to this second preferred embodiment.

As can be seen from the flowchart shown in FIG. 13, according to this preferred embodiment, it is determined, by a difference in focus control drive value, that the focus position has failed to reach the target layer as a result of the layer-to-layer jump operation.

Figure 14:
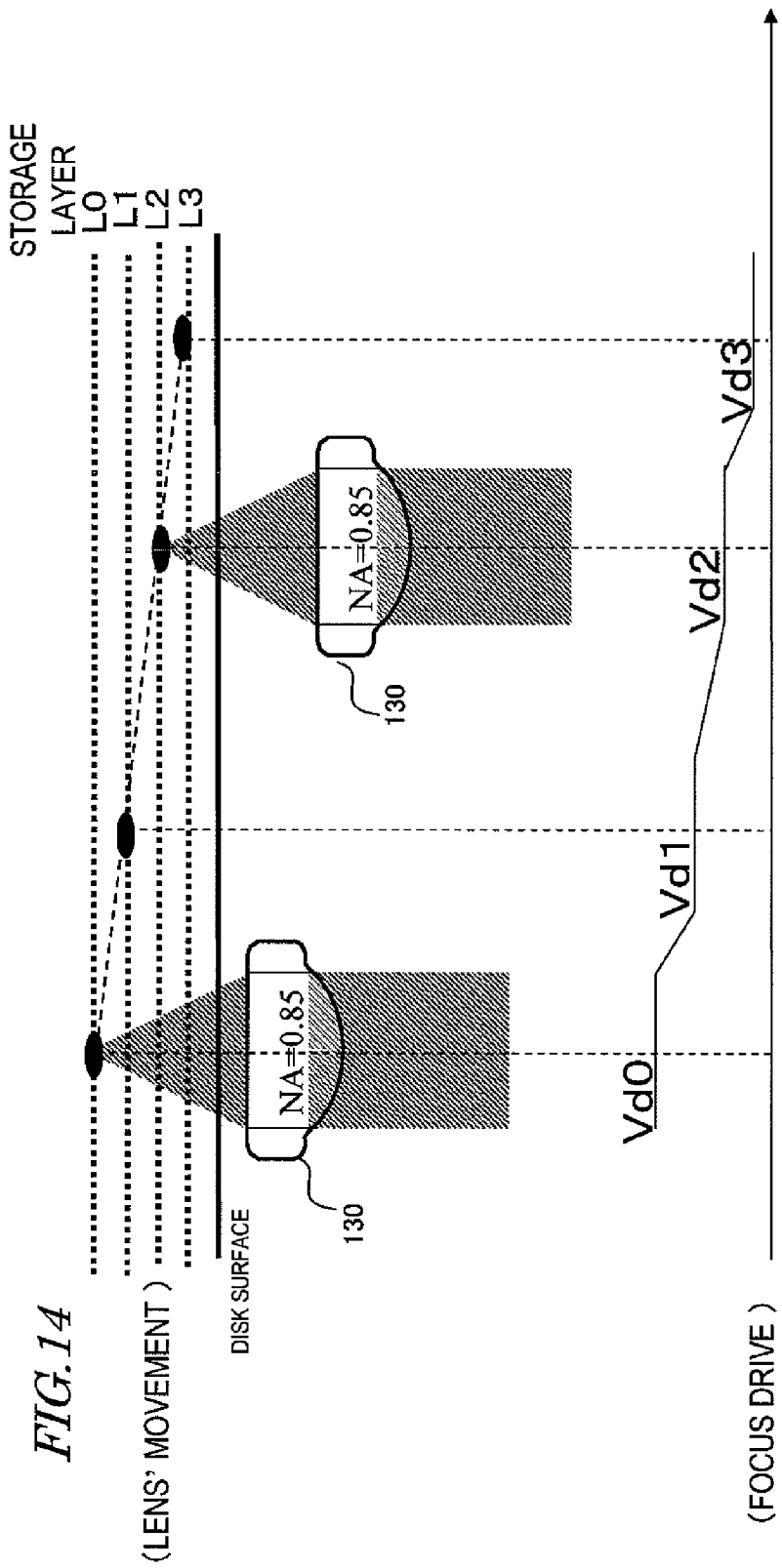
FIG. 14 is a schematic representation illustrating the amplitudes of a focus drive signal to show how to perform error detection and recovery according to the second preferred embodiment.

FIG. 14 shows how the focus drive signal changes its level with the layer on which the focus position has been set. In FIG. 14, Vd0, Vd1, Vd2 and Vd3 represent drive voltages when the focus position is set on the L0, L1, L2 and L3 layers, respectively.

As the level (or the height) of the objective lens slightly changes with respect to the respective storage layers, the DC component of the focus drive signal also varies. A pickup normally has a focus DC sensitivity of 5 to 10 mm/A and a coil resistance of 6 to 30Ω. Thus, if Vd2 with respect to the L2 layer is set to be a reference voltage of 0 V when the pickup has a DC sensitivity of 5 mm/A and a coil resistance of 6Ω, then the drive values Vd0, Vd1, and Vd3 for the L0, L1 and L3 layers are calculated, by the difference in height shown in FIG. 11, to be:

$Vd0 = Id0 \times Rc = 0.035/5 \times 6\Omega = 0.042 \text{ V} = 42 \text{ mV}$ $Vd1 = Id1 \times Rc = 0.017/5 \times 6\Omega = 0.0204 \text{ V} = 20 \text{ mV}$ $(Vd2 = 0)$ $Vd3 = Id3 \times Rc = 0.0105/5 \times 6\Omega = 0.0126 \text{ V} = 13 \text{ mV}$ Thus, these levels will be detectible as digital signals when subjected to A/D conversion.

In this case, when the optical disk apparatus is started by getting loaded with a disk, the focus drive signal associated with each of these layers is fed back to the servo controller 106. And a DC value is extracted using a drive detecting section 1201 and a low-pass filter (LPF) 1202, input to the CPU 146 and then stored in advance in the memory 109. Subsequently, if a focus drive value is also detected through the same signal path after the layer-to-layer jump has been made and if that drive value and the value stored during the disk loading process are compared to each other, it can be determined quickly whether the focus position of the light beam has reached the target L2 layer successfully or has been set by mistake on the preceding L1 layer or the following L3 layer, or whether the focus control has failed completely.

Hereinafter, it will be described with reference to FIG. 13 how to detect an error and make recovery from that error according to this preferred embodiment.

According to this preferred embodiment, as already described for the first preferred embodiment with reference to FIG. 9, it can be sensed quickly and directly as an error that the focus position has been set by mistake on a non-target layer as a result of a layer-to-layer jump.

Specifically, even after the CPU (decision section) 146 has determined that the focus position has been set on a wrong layer by mistake, the CPU (layer determining section) 146 also detects in Step ST110 the focus drive value as described above after the layer-to-layer jump has been made, and also compares that value to the focus drive value that has been stored in the memory 109. Next, in Step ST111, the CPU 146 determines, based on the result of the previous processing step ST110, exactly where that storage layer on which the focus position has been set by mistake is located. If the current layer has turned out to be the L1 layer that precedes the target layer, then the spherical aberration for the target L2 layer is re-set and then a layer-to-layer jump operation is performed in Step ST93 so that the distance to go for the focus position is extended by one layer. On the other hand, if the current layer has turned out to be the L3 layer that follows the target layer, then the spherical aberration for the target L2 layer is re-set and then a layer-to-layer jump operation is performed in Step ST93 so that the distance to go for the focus position is shortened by one layer. In this manner, the process can enter the recovery sequence quickly, too.

Furthermore, if the focus control has failed completely, then the focus drive voltage should have an abnormal value that is equal to or greater than the maximum permissible value. In that case, the focus control is quickly turned OFF in Step ST112 and the lens is moved in Step ST113 with the spherical aberration adjusted to the target L2 layer, thereby setting the focus position on the L2 layer directly.

Alternatively, the focus position may also be re-set on the deepest L0 layer following the disk loading sequence and then the layer-to-layer jump may be made once again so that the focus position shifts to the L2 layer.

As described above, even if the focus position has been set on a wrong layer of a quadruple-layer disk, the error can be detected and recovery from that error can made quickly, no matter what pattern of layer-to-layer jump has been made on that disk.

In addition, according to this preferred embodiment, the error is detected from a quadruple-layer disk based on the focus drive value associated with the current layer on which the focus position has been set, because the focus drive value varies with the depth of the information layer. That is why if the depths of respective information layers are defined by standard or if the spherical aberration can be adjusted to each layer during the disk loading process, recovery can be made easily from any such error. Consequently, the technique of the present invention is applicable effectively to not just a quadruple-layer disk but also any other multilayer disk with three or more information layers.

(Embodiment 3)

Detection of Layer-to-Layer Jump Error and Recovery with Address Value

A third specific preferred embodiment of the present invention to be described below is also supposed to be applied to a situation where a layer-to-layer jump is made from the L0 layer of a quadruple-layer disk to the L2 layer thereof. In the first preferred embodiment described above, if the focus control has gotten done by mistake on a non-target layer during the layer-to-layer jump operation, the spherical aberration is supposed to be readjusted with respect to that layer on which the focus position is currently located by mistake. Then, by comparing the spherical aberration readjusted value to the spherical aberration that has been adjusted (or corrected) with respect to each layer during the disk loading process, it is determined exactly on which layer the focus position is currently located. On the other hand, according to this third preferred embodiment, the spherical aberration is not readjusted but the known spherical aberration correction values that have been obtained in advance for the respective layers are tentatively adopted one after another, thereby determining, by either the correction value that maximizes the amplitude of the TE signal or the correction value with which an address can be obtained by turning the tracking control ON, exactly on which layer the focus position has been set by mistake.

Figure 15:
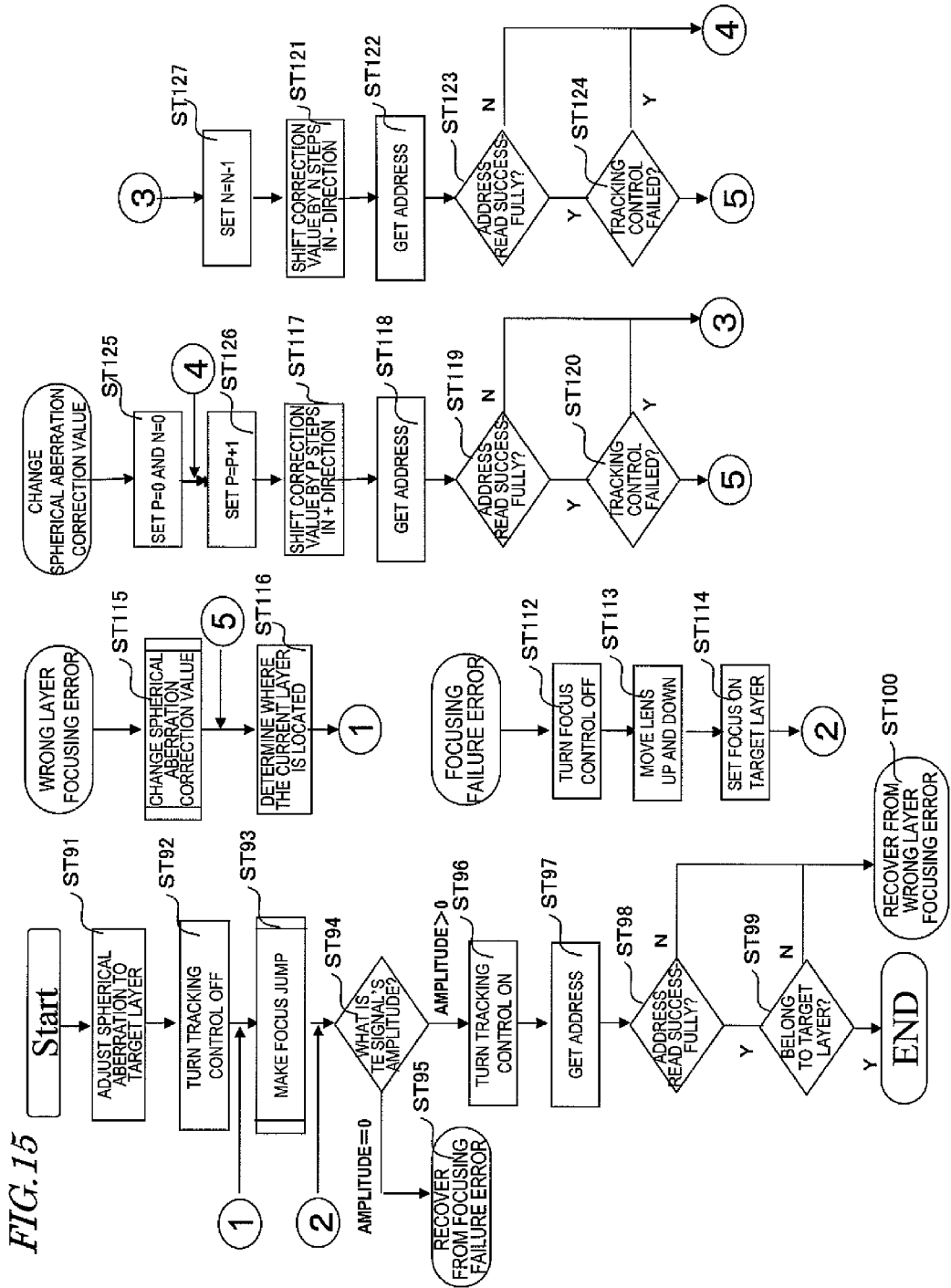
FIG. 15 is a flowchart showing the procedure of recovery according to a third preferred embodiment of the present invention.

FIG. 15 is a flowchart showing the procedure of a recovery process according to this preferred embodiment. In FIG. 15, the same processing steps as the counterparts of the first and second preferred embodiments described above are identified by the same reference numeral and the description thereof will be omitted herein.

As in the first and second preferred embodiments of the present invention described above, a layer-to-layer jump is made in Step ST93. The CPU determines in Step ST94 whether or not the amplitude of the TE signal is equal to or greater than a predetermined value. If the answer is YES, the tracking control gets done in Step ST96. After that, in Step ST97, the PLL gets locked to obtain an address. If the address obtained turns out to be an address on the target layer (in Steps ST98 and ST99), then it can be determined that the layer-to-layer jump has been made successfully and that the focus position has reached the target layer. In that case, a seek operation to get ready for a read/write operation or any other subsequent processing can be started.

On the other hand, unless an address on the target layer can be obtained in Step ST98, then the focus position must have been set on a non-target layer by mistake. Thus, it is determined that the process should advance to the processing step ST100 of recovering from a wrong layer focusing error.

The processing step ST100 of recovering from a wrong layer focusing error starts with spherical aberration correction value changing step ST115, in which P and N that are shift number counters of spherical aberration correction are reset into zero in Step ST125 first, and then the shift number counter P in the positive direction (i.e., in the direction in which the information layer depth increases) is incremented by one in Step ST126.

Thereafter, in Step ST117, the spherical aberration correction value is shifted in the positive direction. That is to say, the correction value is changed into the one for the target layer minus one (e.g., 84.5±5 μm that is the depth of the information layer L1 in this example). After that, in Step ST118, the address is read. If the modified spherical aberration correction value conforms to the current layer, then the PLL should get locked and the address should be readable in Step ST119. In that case, the current layer can be determined to be L1 layer.

On the other hand, if no address can be read in Step ST119, then the shift number counter N in the negative direction (i.e., in the direction in which the information layer depth decreases) is decremented by one in Step ST127. Thereafter, in Step ST121, the spherical aberration correction value is shifted in the negative direction. That is to say, the correction value is changed into the one for the target layer plus one (e.g., 54.5±5 μm that is the depth of the information layer L3 in this example). After that, in Step ST122, the address is read. If the modified spherical aberration correction value conforms to the current layer, then the PLL should get locked and the address should be readable in Step ST123. In that case, the current layer can be determined to be L3 layer.

In this case, if the tracking control loses its stability (turns NG) so much while the spherical aberration correction value is being changed that the tracking control fails completely or the waveform gets significantly wavering due to disturbance vibration (in Steps ST120 and ST124), then the spherical aberration correction value clearly does not belong to the layer on which the focus position is currently set. That is why in that case, the process should branch to the processing step ST127 or ST126. Specifically, if the process branches to the processing step ST127, the spherical aberration correction value is turned into the negative one in the opposite direction (i.e., of the opposite polarity) and a modified correction value is set by shifting the former correction value by N steps (in Step ST121). On the other hand, if the process branches to the processing step ST126, the spherical aberration correction value is turned into the positive one in the opposite direction (i.e., of the opposite polarity) and a modified correction value is set by shifting the former correction value by P steps (in Step ST117). If the address can be read in this manner (through either the processing steps ST122 through ST124 or the processing steps ST118 through ST120), then that address value is confirmed in Step ST116, thereby determining the current layer. However, if no address can be read in either Step ST123 or Step ST119, then the focus position is still set on another layer. Thus, in that case, the process needs to branch to either the processing step ST126 or the processing step ST127 again and same process is carried out all over again. That is to say, in the processing step ST126, the spherical aberration correction value is changed into a positive one and a modified correction value is set by shifting the former correction value by P steps. Or in the processing step ST127, the spherical aberration correction value is changed into a negative one and a modified correction value is set by shifting the former correction value by N steps.

As described above, according to this preferred embodiment, by sequentially changing the spherical aberration correction value stepwise according to the number of layers and the position of the target layer in the disk loaded so that the modified spherical aberration correction value conforms to target layer±1 and then target layer±2, it can be determined exactly in which direction and at what position the current layer is located with respect to the target layer.

Figure 16:
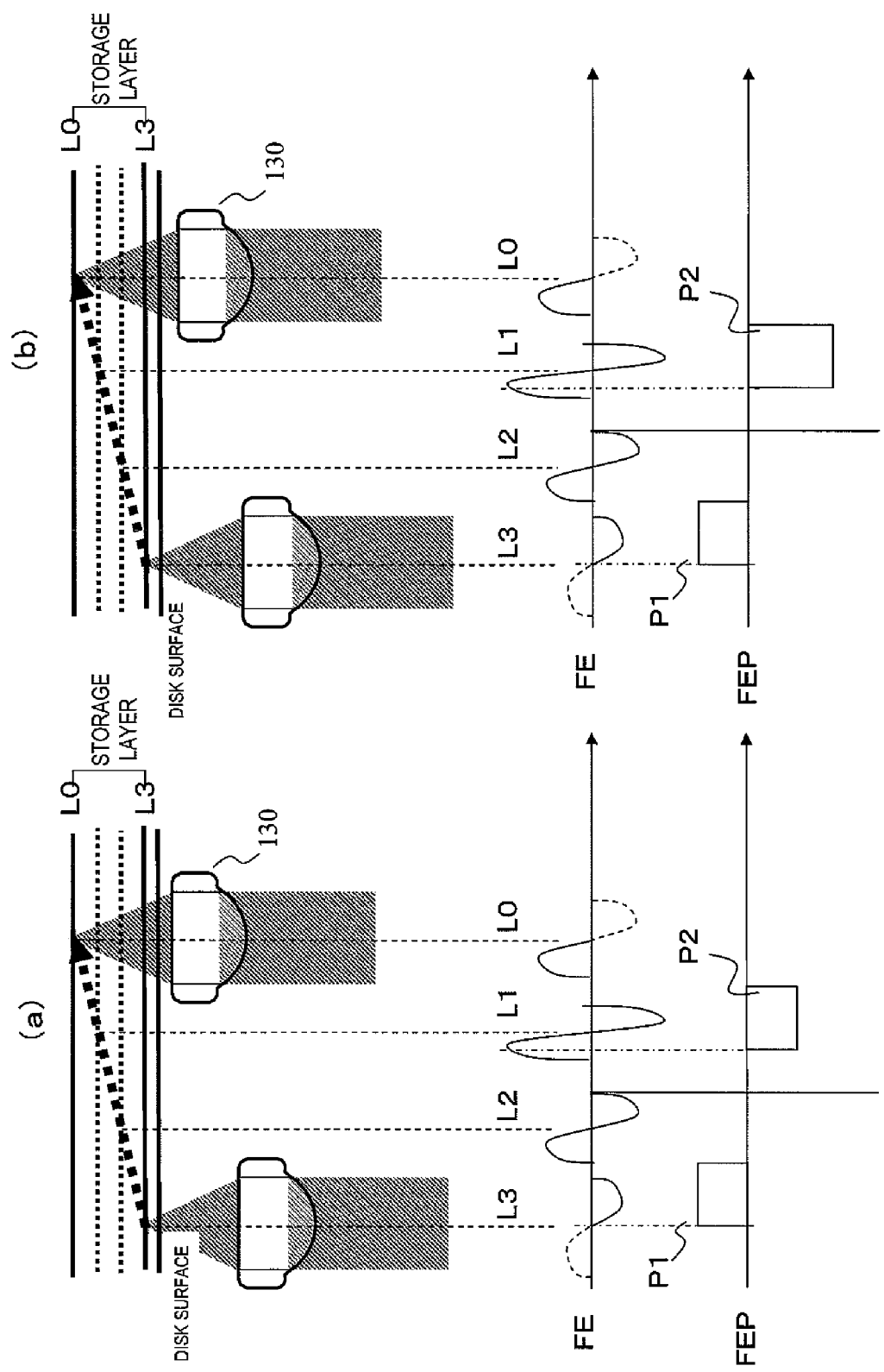
FIG. 16 shows the waveforms of drive signals for use to carry out a layer-to-layer jump more effectively.

In the preferred embodiment described above, the spherical aberration correction value is supposed to be changed first into the one that is located in the negative direction with respect to the target layer. However, as shown in FIG. 16, the energy product (i.e., the pulse height×time width) of the acceleration and deceleration pulses of the layer-to-layer jump may be adjusted so that the acceleration pulse is slightly smaller than the deceleration pulse and that the focus position will be set on the preceding layer if the focus position has failed to be set on the target layer. Then, the recovery process can get done in a shorter time with much higher probability.

FIG. 16 illustrates where the lens needs to move and how an FE signal and a focus drive signal including acceleration and deceleration pulses to apply change their waveforms in a situation where a layer-to-layer jump is performed from the shallowest L3 layer toward the deepest L0 layer.

In portion (a) of FIG. 16, the acceleration and deceleration pulses P1 and P2 have opposite polarities and the same magnitude as in the prior art. In portion (b) of FIG. 16, on the other hand, the deceleration pulse P2 has a greater pulse height than the acceleration pulse P1. This means that the magnitude of deceleration (braking) is greater than that of acceleration. That is to say, if the layer-to-layer jump has failed due to a variation in its shift velocity under significant axial runout, vibration or impact, then the focus position is very likely to have been set on the layer that precedes the target layer. Thus, the direction in which the spherical aberration correction value is changed for the first time just needs to agree with the direction in which that layer is located.

Particularly, considering that the lens could collide against the disk during the layer-to-layer jump, it would be safer for the lens to go farther than the predetermined point in making a layer-to-layer jump from a deeper layer to a shallower layer. That is why the acceleration pulse is set to be greater than the deceleration pulse and when an error occurs, the spherical aberration correction value is changed into the one associated with a layer that is located in the positive direction. In making a layer-to-layer jump from a shallower layer to a deeper layer, on the other hand, it would be safer for the lens to stop before reaching the predetermined point. For that reason, it is preferred that the acceleration pulse be set to be smaller than the deceleration pulse and when an error occurs, the spherical aberration correction value be changed into the one associated with a layer that is located in the negative direction.

(Embodiment 4)

Figure 17:
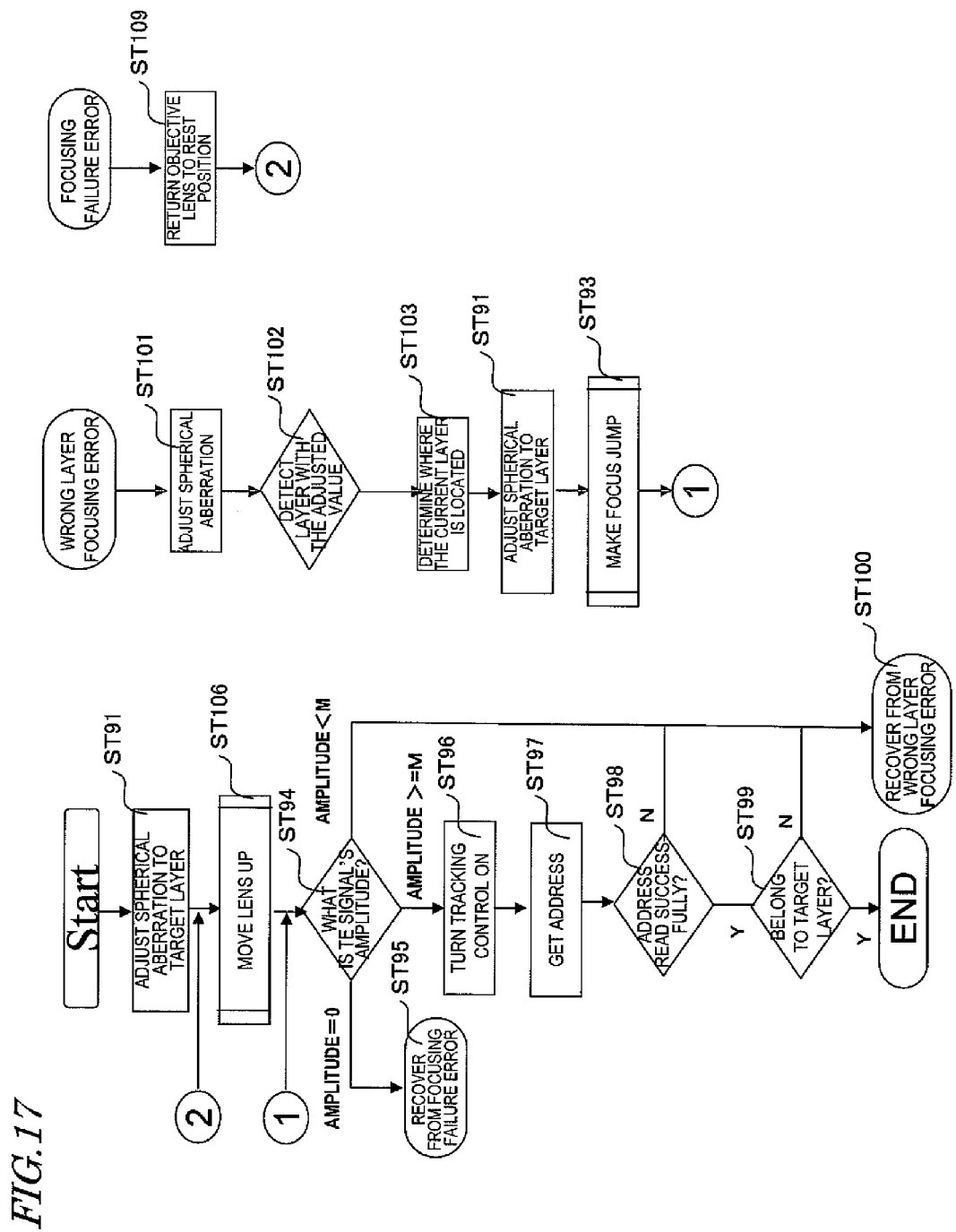
FIG. 17 is a flowchart showing the procedure of setting a focus position on target layer according to a preferred embodiment of the present invention.
Figure 18:
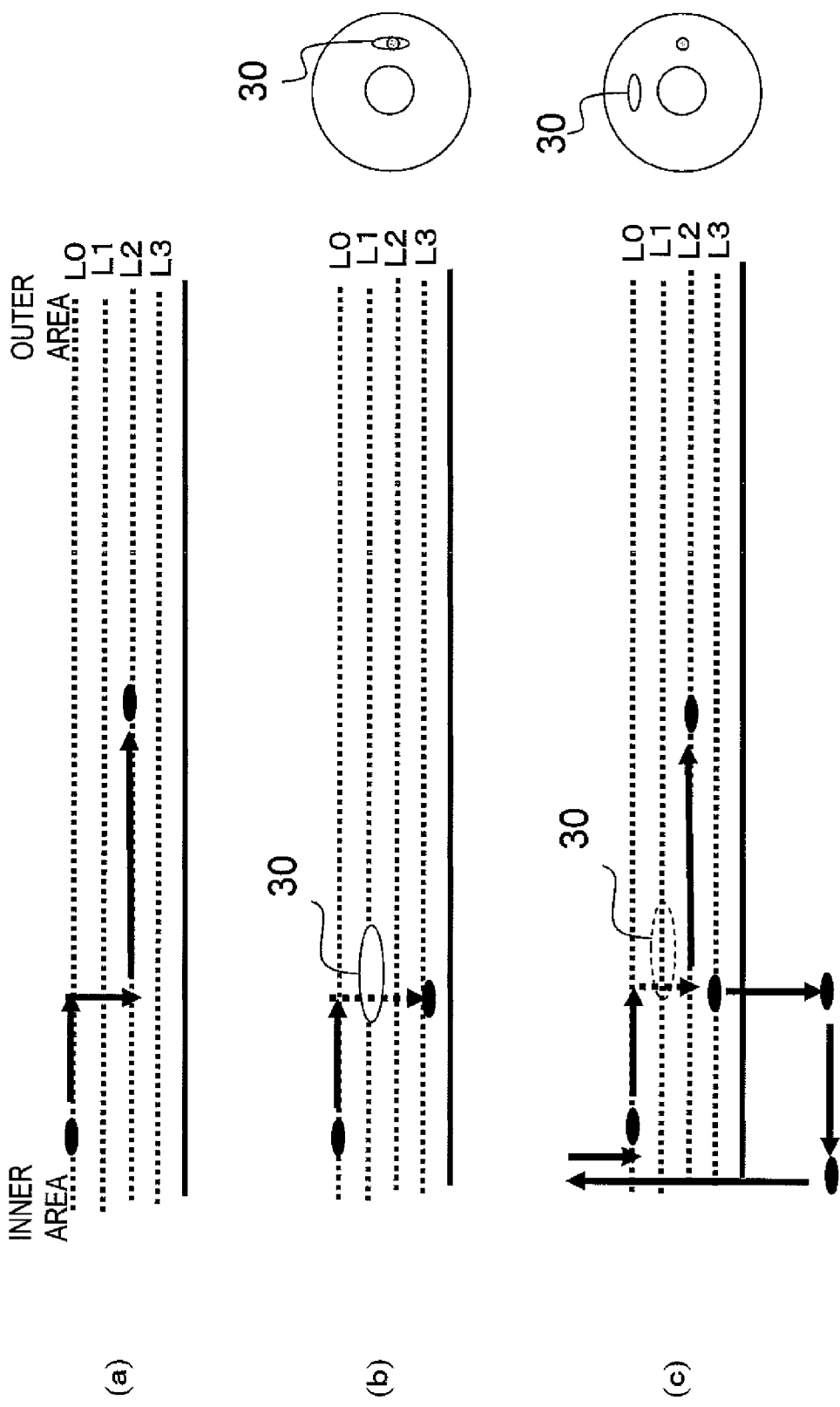
FIGS. 18(*a*), 18(*b*) and 18(*c*) show how a focus jump operation may be performed by a conventional technique while data is being read or written.

Hereinafter, it will be described with reference to FIG. 17 what operation needs to be performed in order to set a focus position on a target information layer of an optical disk that has been loaded into an optical disk apparatus. FIG. 17 is a flowchart showing how to detect such a focus setting error and how to recover from such an error. According to this preferred embodiment, the focus position is shifted toward the target layer in a situation where there is no focus position on the current information layer.

First of all, the system controller 111 receives a focus setting instruction that the focus position of a light beam be shifted toward the target layer of the given multilayer optical disk 100. In Step ST91, the spherical aberration is adjusted to the target layer. Next, in Step ST106, the objective lens is brought closer to (i.e., moved toward) the multilayer optical disk 100, thereby starting to shift the focus position of the light beam, which has been converged by the objective lens, toward the target layer.

When the focus position of the light beam reaches the layer that seems to be the target layer, a focus control is started. In Step ST94, the amplitude detecting section 161 measures the amplitude of a TE signal, thereby determining whether or not the TE signal is output at all and whether the amplitude of the TE signal is less than, or equal to or greater than, a predetermined value M. If the focus control has failed entirely, then no TE signal is output at all. Thus, if the TE signal has zero amplitude, it is determined that the focus control has failed and the process advances to the processing step S95 of recovering from such a focusing failure error.

On the other hand, if it has been determined in Step ST94 that the amplitude of the TE signal is smaller than the predetermined value M, then the focus position of the light beam must have been set by mistake on a non-target layer and the focus control is being performed on that wrong layer. Thus, if the amplitude of the TE signal is smaller than M, the CPU 146 determines that the focus position have been set on a non-target layer and the process advances to. Step ST100 of recovering from such a wrong layer focusing error as will be described later.

Furthermore, if the CPU 146 has found in Step ST94 the amplitude of the TE signal not less than the predetermined value M, then probably the focus position has reached the target layer. That is why in that case, the tracking control is turned ON in Step ST96 to get the address of that layer in Step ST97. If address information has been obtained successfully in Step ST98 and has turned out to be the address on the target layer in Step ST99, then the process ends normally.

On the other hand, if no address information has been obtained in Step ST98, then the CPU 146 determines that the focus position has been set on a non-target layer and the process advances to Step ST100 as in the situation where the amplitude of the TE signal has decreased.

Next, it will be described how to recover from such a wrong layer focusing error.

If it has turned out in Step ST94 that the amplitude of the TE signal is smaller than the predetermined value M, spherical aberration learning is carried out in Step ST101 so as to maximize the amplitude of the TE signal on that layer with the tracking control kept OFF. On the other hand, if no address information has been obtained in Step ST98, then the tracking control is turned OFF again and spherical aberration learning is carried out so that the amplitude of the TE signal becomes maximum on that layer.

In this preferred embodiment, before the focus setting operation described above is started, a disk loading process (loading learning) is carried out to determine a spherical aberration correction value for each layer. Then, the spherical aberration correction value for each layer is stored in the memory 109 shown in FIG. 2.

Next, in Step ST102, the CPU 146 determines, by using such a spherical aberration value that maximizes the amplitude of the TE signal, on which of the multiple layers the focus position is currently located. For example, if the focus setting operation has been performed with a target set on the L2 layer of a quadruple-layer disk, then a significant spherical aberration will be produced on each of its adjacent L1 and L3 layers due to the difference in information layer depth as shown in FIG. 10. Thus, by comparing the spherical aberration value that has been readjusted to maximize the amplitude of the TE signal to the spherical aberration value that is stored in the memory for each layer, the CPU 146 can determine easily where the focus position of the light beam is currently located (i.e., which of the multiple storage layers the non-target storage layer is (the current layer)) in Step ST103.

If the current layer has turned out, as a result of the spherical aberration readjustment, to be the L1 layer that precedes the target layer, then the spherical aberration for the target L2 layer is re-set in Step ST91 and then a layer-to-layer jump operation is performed in Step ST93 so that the distance to go for the focus position is extended by one layer. On the other hand, if the current layer has turned out to be the L3 layer, then the spherical aberration for the target L2 layer is re-set in Step ST91 and then a layer-to-layer jump operation is performed in Step ST93 so that the distance to go for the focus position is shortened by one layer.

On the other hand, if it has turned out in Step ST94 that a focusing failure error has occurred, the objective lens is returned to its rest position in Step ST109. After that, the same series of processing steps that starts with the processing step ST106 is retried all over again.

Optionally, in attempting to set a focus position on the target layer, the respective processing steps that have been described with reference to FIGS. 13 and 15 may be carried out so as to be modified as in this preferred embodiment.

The focus setting method of this preferred embodiment may be carried out by an optical disk apparatus that has the configuration shown in FIG. 2.

If a focus jump operation is performed while the optical disk apparatus is being loaded with an optical disk, then the focus position of the light beam is usually shifted in the inner area of the optical disk. Specifically, the focus position of the light beam is shifted in the inner area of the optical disk perpendicularly to the respective storage layers of the optical disk.

On the other hand, the focus jump operation may also be carried out while a write operation is being performed on a multilayer optical disk. In that case, the focus jump operation needs to be performed within the user data area of the multilayer optical disk.

Hereinafter, it will be described with reference to FIGS. 18 through 21 how a focus jump operation may be carried out while data is being read or written.

When data is going to be written on a quadruple-layer disk, the arrangement of the data to be written on the L0 through L3 layers of the disk is determined by a file system. The same can be said about a multilayer optical disk with five or more storage layers. For example, after data of a predetermined block has been written on the L0 layer, a layer-to-layer jump may need to be made from the L0 layer to the L2 layer at that location. In that case, data of the following block is written on the L2 layer after the layer-to-layer jump to the L2 layer has been made.

The host 113 shown in FIG. 1 gives an instruction to write data of a certain block to the system controller 111 of the optical disk apparatus by way of the IF circuit 112. In response, the system controller 111 converts the logical address of that instruction into a physical address. Also, the system controller 111 sends a seek command and a write command to the servo controller 106. In that case, the seek command includes a command about what track on the same layer the focus position should be shifted to and a command about the focus jump.

First of all, it will be described with reference to FIG. 18(a) how a focus jump can be made in a situation where there is no bubble or any other defect in the optical disk. In such a situation, a write operation is carried out from some location in the inner area of the L0 layer toward the outer edge thereof in accordance with those commands. And when the focus position of the light beam reaches a predetermined location on the L0 layer, the servo controller 106 starts a layer-to-layer jump from the L0 layer toward the L2 layer. Specifically, for that purpose, the operation that has been described with reference to FIG. 9 is performed. After the focus position of the light beam has reached the L2 layer, a focus setting operation and a tracking control operation are performed on the L2 layer. After that, an address is read from the L2 layer to detect the current location. If the layer-to-layer jump toward the L2 layer gets done normally, then the focus position is moved to an intended track by performing a seek operation over a relatively short distance and a data write operation is resumed at a predetermined writing start position.

When the data of the predetermined data has all been written, the host 113 will be notified of the end of that write operation. Optionally, as in writing computer data, the focus position may return to the starting point on the L0 layer and a verify operation may be performed.

Next, it will be described with reference to FIG. 18(b) what if there is a bubble on the L1 or L2 layer of the quadruple-layer disk and if the location of that bubble happens to coincide with the destination of the focus jump to make. In that case, the S-curve signal of the focus error signal decreases so much due to the influence of the bubble that the focus position cannot be set on the target L2 layer but may be set on the following L3 layer by mistake.

Figure 19:
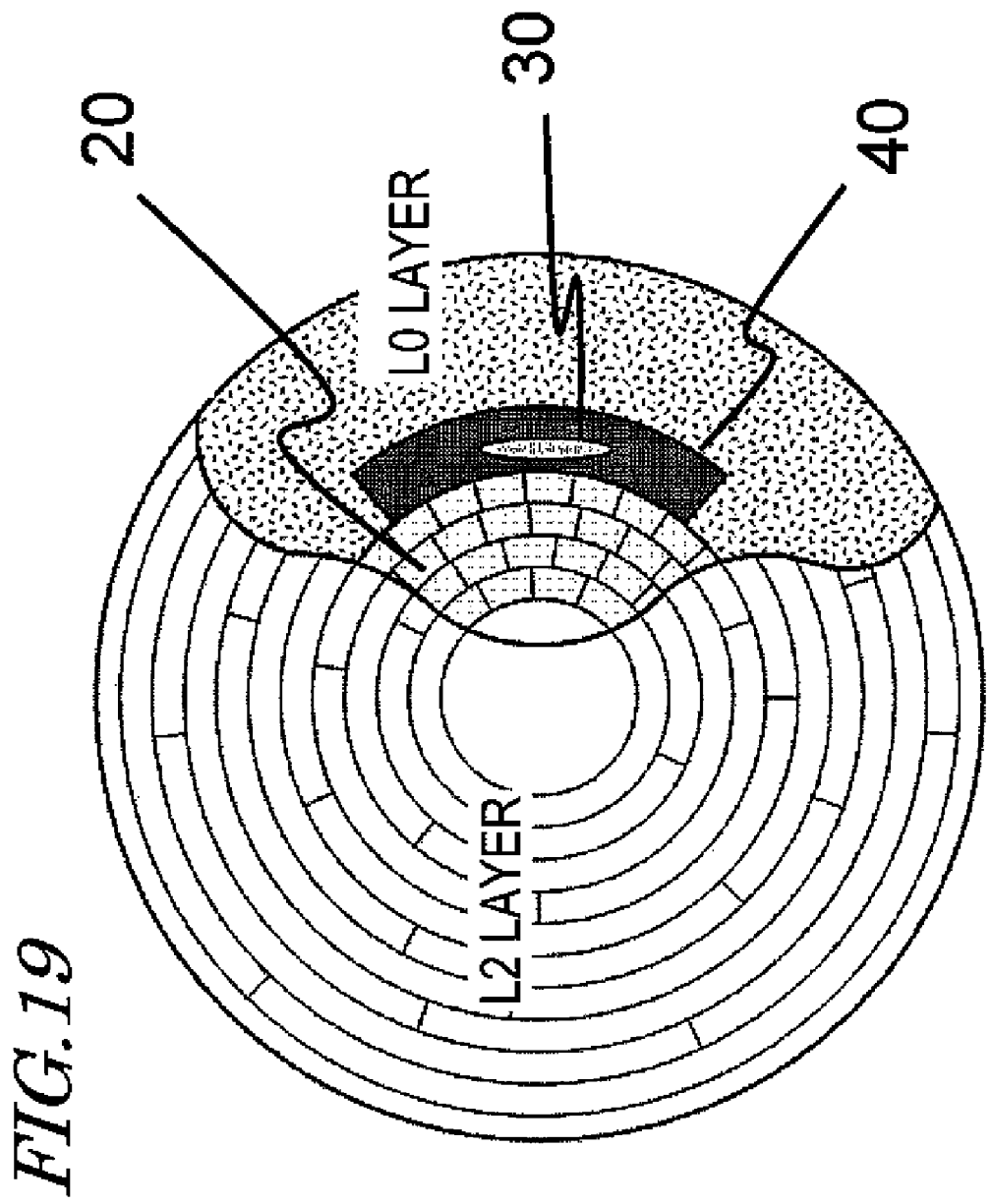
FIG. 19 illustrates exemplary positions of a bubble 30 and a defective area 40 in an optical disk and also shows how a focus jump operation may be affected by them.
Figure 20:
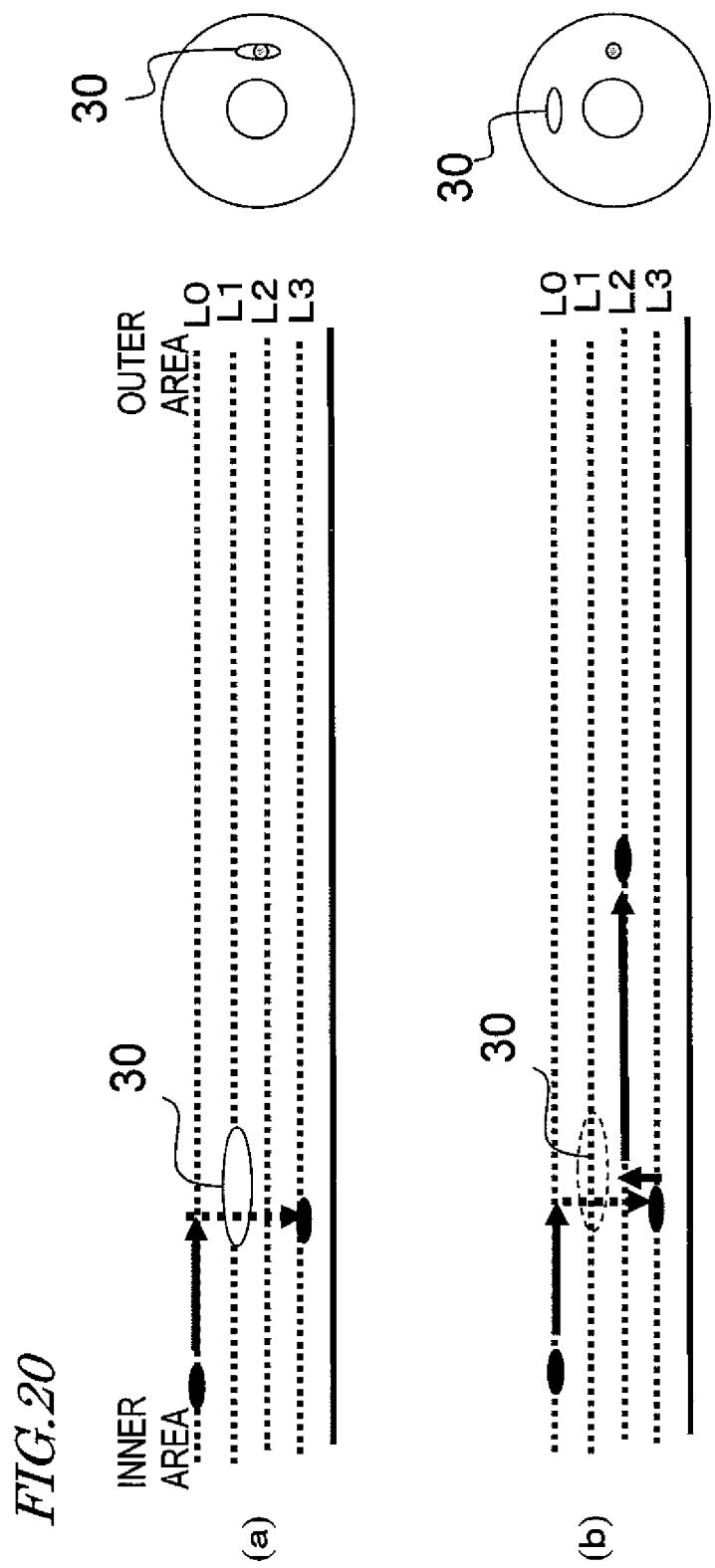
FIGS. 20(*a*) and 20(*b*) show how a focus jump operation may be performed in a preferred embodiment of the present invention while data is being read or written.

FIG. 19 is a partially cutaway view schematically illustrating a quadruple-layer disk, of which an upper part has been removed so that the L2 and L0 layers thereof can be seen partially. As shown in FIG. 19, a write operation has been performed on a predetermined area 20 of the L0 layer from some inner location toward the outer edge thereof, a focus jump is made at some radial location on the optical disk from the L0 layer toward the L2 layer, and there is a bubble 30 on the way near the L2 layer. Suppose a situation where the S-curve signal of the focus error signal decreases so much due to the influence of that bubble 30 that the focus position cannot be set on the target L2 layer but is set on the following L3 layer by mistake.

In that case, a conventional optical disk apparatus will stop the focus control once to bring the objective lens down and move it away from the optical disk. Next, the apparatus will move the objective lens to the inner area of the optical disk where there is little axial runout. Then, at that location, the apparatus will raise the objective lens from the lowest level, thereby setting the focus position on the deepest L0 layer of the optical disk. After that, a seek operation will be performed through the writing end track of the L0 layer, where a focus jump operation will be retried.

A bubble area that significantly affects a focus jump operation is usually about φ1 mm to about φ3 mm in diameter. That is why in most cases, the focus jump can be done successfully when retried for the second time. However, the overall time it takes to retry the focus jump by the conventional technique will be the sum of the time for moving the optical pickup to the inner area of the optical disk after the focus control has once been stopped, the time for setting a focus position on the L0 layer, and the time for reaching a predetermined track on the L0 layer through a seek operation. Normally, it will take one second to detect an error, 200 ms to stop the focus control once and move the optical pickup to the inner area of the optical disk, one second to set the focus position on the L0 layer again, 200 ms to get the seek operation done again, and another 200 ms to get the focus jump done once again. Thus, the sum of these amounts of time required is approximately 2.6 seconds. If a TV program is recorded in real time on an optical disk, the space left in the buffer memory of an optical disk apparatus could be so narrow that part of that program could not be recorded in some cases. According to this preferred embodiment of the present invention, however, such a problem can be avoided.

In this preferred embodiment, after the focus position of the light beam has been sensed to have passed through the target L2 layer and reached the L3 layer by mistake due to the presence of a bubble as shown in FIG. 20(a), a focus jump operation from the L3 layer toward the target L2 layer is performed as shown in FIG. 20(b). The overall time it takes to get these operations done is much shorter than the sum of the amounts of time it takes to get the recovery done by the conventional technique. For example, it usually takes 200 ms to sense that the focus position of the light beam is currently located on the L3 layer and another 200 ms to get the focus jump done once again, and therefore, it takes just about 0.5 seconds to get the recovery done according to this preferred embodiment. Consequently, according to this preferred embodiment, the space left in the buffer memory would not get so little and the chances of failing to record every broadcast data in real time are very slim.

Figure 21:
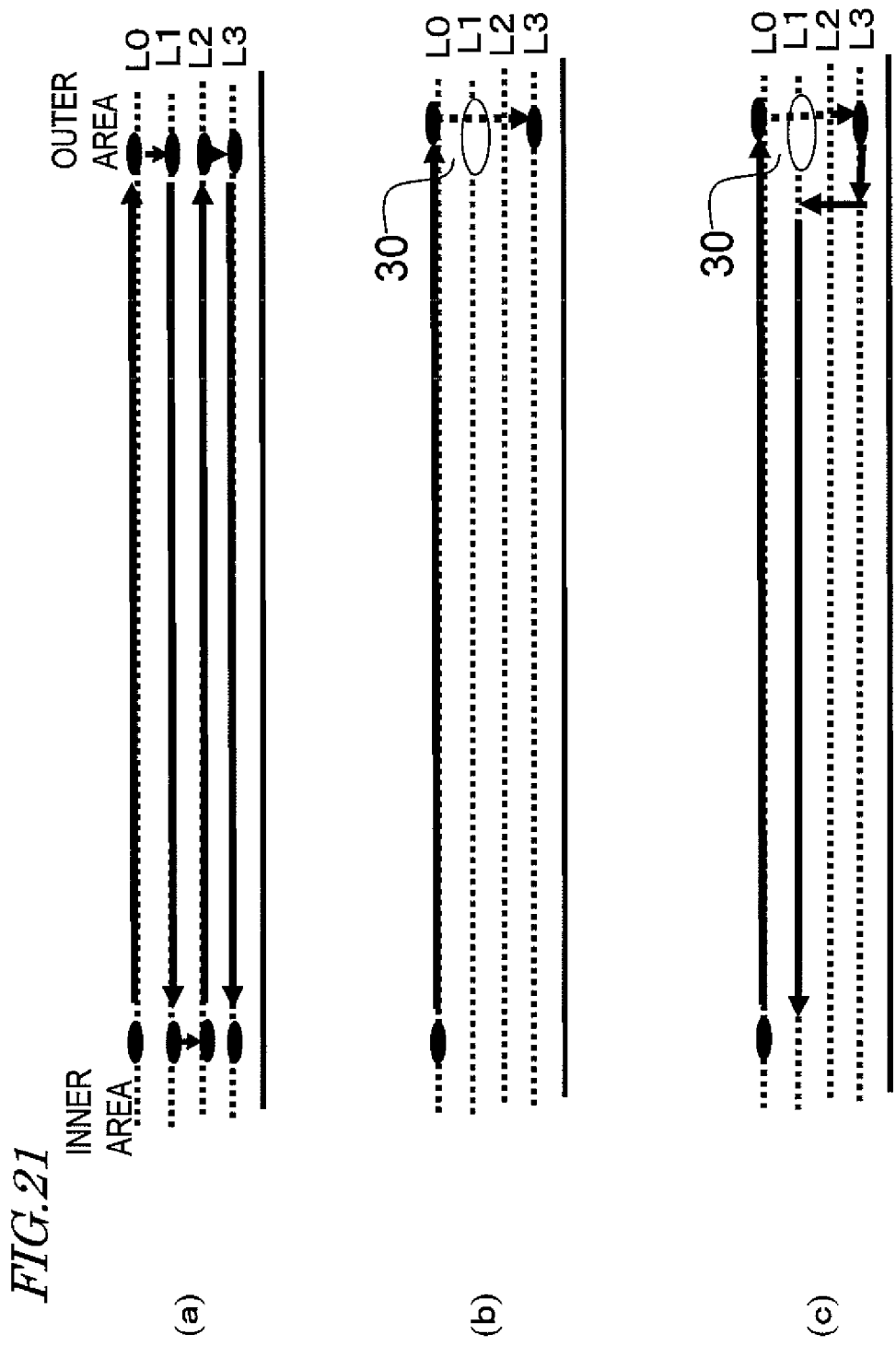
FIG. 21 shows how a focus jump may be performed in a preferred embodiment of the present invention while data is being read from a quadruple-layer ROM.

Next, it will be described with reference to FIG. 21 what if a long video content such as a movie that has been recorded over all four layers of a quadruple-layer disk is going to be played back on a player. In that case, the playback is usually carried out from the inner area of the deepest L0 layer of the optical disk toward the outer edge thereof as shown in FIG. 21(a). In other words, the focus position of the light beam moves from some inner radial location toward the outer edge on the L0 layer. And when the focus position of the light beam reaches the outermost area of the L0 layer, a focus jump is performed at that radial location from the outermost area of the L0 layer to that of the L1 layer. After that, the playback is continued in the opposite direction, i.e., from the outermost area of the L1 layer toward the innermost area thereof. That is to say, the focus position of the light beam moves from the outermost area toward the innermost area on the L1 layer. And when the focus position of the light beam reaches the innermost area of the L1 layer, a focus jump is performed at that radial location from the L1 layer to the L2 layer. When such a playback is carried out, the focus jump is supposed to be performed at a particular radial location (which may be either the outermost location or the innermost location) on the optical disk as described above. That is why if there is a bubble or any other defect at that particular radial location (i.e., the innermost or outermost location) on the optical disk, the focus jump is very likely to fail. It can be said that a similar problem could arise in a quadruple-layer ROM disk, which has not been put on the market yet.

As described above, if there is a bubble in an optical disk, the S-curve signal of a focus error signal (FE), which has been generated around the bubble, will have a deformed waveform or a decreased peak. That is why if there is a bubble at the outermost radial location of the optical disk and near the L1 layer, for example, as shown in FIG. 21(c), a focus jump operation from the L0 layer to the L1 layer could fail and the focus position could pass through the L1 layer and reach the L3 layer by mistake.

According to this preferred embodiment, the focus jump is not retried at the radial location where the focus jump has failed but the focus position of the light beam is changed to a radial location that is about 1 mm (corresponding to 3000 tracks) away from the former radial location and that is too far away from the bubble to be affected by it as shown in FIG. 21(c). Then, the focus jump is made at that radial location from the L3 layer toward the L1 layer. In this preferred embodiment, the focus jump is retried at a radial location that is sufficiently away from the location where the focus jump has failed, because otherwise (i.e., if the focus jump from the L3 layer to the L1 layer were simply retried at the same radial location), the focus jump could fail again due to the presence of that bubble.

In that case, to avoid running the risk of retrying the focus jump over and over again at the same radial location, according to this preferred embodiment, the focus position of the light beam is changed on the L3 layer along the radius of the optical disk without once stopping the focus control. And the focus jump is attempted again at a bubble-free location. Consequently, the time it usually takes to set the focus position can be cut down and the focus jump can start being retried in a shorter time. According to the conventional technique, if the focus jump has failed, the focus control is once stopped entirely and the focus setting operation is started all over again. In that case, however, if the optical disk has a significant warp or axial runout, the focus setting operation itself could fail. On the other hand, according to this preferred embodiment, such a failure is avoidable.

Also, if the focus setting operation itself failed, the objective lens of the optical pickup could collide against the optical disk and would make a scratch all around the disk surface. If the optical disk got such a scratch, the reflected light would be scattered by the scratch. As a result, the servo control would lose stability and data could not be retrieved as intended.

According to this preferred embodiment, even if the focus position of a light beam has reached, and set on, a non-target layer as a result of a focus jump operation, the light beam is not defocused from that layer but the focus position is just changed on the same layer to a different radial location and then a focus jump toward the target layer is retried. The time it takes to get the focus setting operation done (which is on the order of a few hundred milliseconds) is much longer than one axial runout period of an optical disk (i.e., the time it takes for the disk to make one revolution). For that reason, the focus setting operation is easily affected by the axial runout of an optical disk. On the other hand, it takes as short as several milliseconds to get a focus jump done. That is why even if the optical disk had a significant axial runout, the focus jump would be hardly affected by the axial runout. Likewise, even if the entire optical disk had a warp, the layer-to-layer distance would remain the same, and therefore, the focus jump should be hardly affected by the warp, either.

Optionally, in a preferred embodiment of the present invention, a range that covers a part of the target track and sectors of a storage layer where the focus jump has failed (or that target track in its entirety) may be registered as a defect as shown in FIG. 19. In the example illustrated in FIG. 19, the range identified by the reference numeral 40 is registered as a defective area. This storage medium may be the memory 109 of the optical disk apparatus shown in FIG. 2. In the range where there is a registered defect 40, the focus jump may never be performed again or no data may ever be written anymore. Among other things, a multilayer disk with three or more storage layers has such a big overall storage capacity that focus jump failures can be minimized by making a focus jump in a non-defective area.

In the preferred embodiments of the present invention described above, it is determined, by checking out the amplitude of a TE signal associated with the current layer (i.e., either by seeing if the TE signal has no amplitude at all or by comparing the amplitude of the TE signal to a reference one), that the focus position has failed to reach the target layer. However, as long as a focus control is being carried out on any of the information layers, the focus jump failure can also be detected by determining whether or not the address is readable with the tracking control turned ON once. Furthermore, even without reading the address, if the spiral direction of the current layer is detected after the focus control and tracking control have been started, it can also be determined whether the focus position has passed through the target layer or stopped at the previous information layer. For that reason, there is no need to perform separately the processing step of determining whether or not the focus setting operation has been done successfully and the processing step of, if it has been determined that the focus has been set on a non-target layer, determining which of the multiple layers the current layer is.

As described above, according to the multilayer optical disk focus jump method of the present invention, even if the focus jump has failed due to a disturbance, for example, it can be determined quickly how and where that error has occurred and the recovery from that error can be made speedily with good stability. Consequently, the present invention contributes to increasing the random accessibility with respect to triple-layer and quadruple-layer BDs. On top of that, the present invention is also applicable to ten-, sixteen- and even twenty-layer disks that will be put on the market in the near future.

In addition, the present invention provides a highly reliable multilayer disk drive for use as not only a non-mobile multilayer BD player or recorder but also a laptop computer disk drive, a disk movie, a portable player or a car player, which is supposed to be exposed to a harsh and shaky environment.

What is claimed is:

1. A method of making a layer-to-layer jump on a multilayer optical disk that has multiple storage layers, the method comprising the steps of:
    receiving a layer-to-layer jump instruction that the focus position of a light beam be shifted from a current layer of the multilayer optical disk, on which the focus position is currently located, to a target layer;
    adjusting a spherical aberration correction value to the target layer and then attempting the layer-to-layer jump toward the target layer;
    if the layer-to-layer jump has failed, determining where a non-target storage layer, on which the focus position has been set by mistake as a result of the layer-to-layer jump, is located; and
    retrying the layer-to-layer jump from that non-target storage layer that has been located to the target layer.

2. The method of claim 1, wherein the step of determining where the non-target storage layer is located is carried out by comparing a spherical aberration correction value, which increases the amplitude of a TE signal of the non-target storage layer and which has been obtained through spherical aberration learning, to a spherical aberration correction value that is stored in advance in a memory for each said layer.

3. The method of claim 1, wherein the step of determining where the non-target storage layer is located is carried out by comparing a focus drive value for the non-target storage layer to a focus drive value that is stored in advance in a memory for each said layer.

4. The method of claim 1, wherein the step of determining where the non-target storage layer is located is carried out by readjusting the spherical aberration correction value and then reading an address from the storage layer on which the focus position of the light beam is currently located.

5. The method of claim 4, wherein the step of determining where the non-target storage layer is located includes readjusting the spherical aberration correction value over and over again until the address is read successfully from the storage layer on which the focus position of the light beam is currently located.

6. The method of claim 1, comprising the step of determining whether or not the layer-to-layer jump has been done successfully,
    wherein if the amplitude of the TE signal after the layer-to-layer jump has been made is less than a predetermined value, then it is determined that the focus position has been set on the non-target storage layer as a result of the layer-to-layer jump.

7. The method of claim 1, comprising the step of determining whether or not the layer-to-layer jump has been done successfully,
    wherein if the amplitude of the TE signal after the layer-to-layer jump has been made is equal to or greater than a predetermined value but if no addresses are readable from the current layer or if the address that has been read from the current layer is not the target layer's, then it is determined that a wrong layer focusing error has occurred.

8. The method of claim 1, wherein the step of retrying the layer-to-layer jump from the non-target storage layer to the target layer includes changing, on that non-target storage layer, the focus position of the light beam along the radius of the optical disk before retrying the layer-to-layer jump from the non-target storage layer to the target layer.

9. The method of claim 1, comprising the step of registering, if the layer-to-layer jump has failed a number of times at the same radial location, a particular area including that radial location at a storage medium.

10. The method of claim 8, wherein the step of retrying the layer-to-layer jump from the non-target storage layer to the target layer includes changing, on that non-target storage layer, the focus position of the light beam along the radius of the optical disk before retrying the layer-to-layer jump from the non-target storage layer to the target layer anywhere but in the registered area.

11. An optical disk apparatus for performing a read/write operation on a multilayer optical disk that has multiple storage layers, the apparatus comprising:
    a controller, which receives an instruction that the focus position of a light beam be shifted to a target layer, which is one of the multiple storage layers;
    a control section, which adjusts a spherical aberration correction value to the target layer and then attempts to shift the focus position of the light beam toward the target layer; and
    a layer determining section for determining, if the focus position has not been shifted successfully, where a non-target storage layer on which the focus position has been set by mistake is located,
    wherein the control section shifts the focus position of the light beam from that non-target storage layer to the target layer by reference to information indicating which of the multiple storage layers the non-target storage layer is.

12. The optical disk apparatus of claim 11, comprising a memory that stores a spherical aberration correction value for each said layer,
    wherein the determining section compares a spherical aberration correction value, which increases the amplitude of a TE signal of the non-target storage layer where the focus position has turned out to be currently set by mistake and which has been obtained through spherical aberration learning, to a spherical aberration correction value that is stored in the memory for each said layer, thereby determining where the non-target storage layer is located in the optical disk.

13. The optical disk apparatus of claim 11, comprising a memory that stores a focus drive value for each said layer,
    wherein the determining section compares a focus drive value for the non-target storage layer where the focus position has turned out to be currently set by mistake to a focus drive value that is stored in the memory for each said layer, thereby determining where the non-target storage layer is located in the optical disk.

14. A method for setting a focus with respect to a multilayer optical disk that has multiple storage layers, the method comprising the steps of:
- receiving a focus setting instruction that the focus position of a light beam be shifted to a target layer;
- adjusting a spherical aberration correction value to the target layer and then attempting the focus setting operation;
- if the focus setting operation has failed, determining where a non-target storage layer, on which the focus position has been set by mistake, is located in the optical disk; and
- making a layer-to-layer jump from that non-target storage layer that has been located to the target layer.

15. The method of claim 14, wherein the step of determining where the non-target storage layer is located is carried out by comparing a spherical aberration correction value, which increases the amplitude of a TE signal of the non-target storage layer and which has been obtained through spherical aberration learning, to a spherical aberration correction value that is stored in advance in a memory for each said layer.

16. The method of claim 14, wherein the step of determining where the non-target storage layer is located is carried out by comparing a focus drive value for the non-target storage layer on which the focus position has turned out to be set by mistake to a focus drive value that is stored in advance in a memory for each said layer.

17. The method of claim 14, wherein the step of determining where the non-target storage layer is located is carried out by readjusting the spherical aberration correction value and then reading an address from the storage layer on which the focus position of the light beam is currently located.

18. The method of claim 17, wherein the step of determining where the non-target storage layer is located includes readjusting the spherical aberration correction value over and over again until the address is read successfully from the storage layer on which the focus position of the light beam is currently located.

19. The method of claim 14, comprising the step of determining whether or not the focus setting operation has been done successfully,
wherein if the amplitude of the TE signal after the focus setting operation has been performed is less than a predetermined value, then it is determined that the focus position has been set on the non-target storage layer as a result of the layer-to-layer jump.

20. The method of claim 14, comprising the step of determining whether or not the focus setting operation has been done successfully,
wherein if the amplitude of the TE signal after the focus setting operation has been performed is equal to or greater than a predetermined value but if no addresses are readable from the current layer or if the address that has been read from the current layer is not the target layer's, then it is determined that a wrong layer focusing error has occurred.

* * * * *